United States Patent [19]

Ramanujam

[11] Patent Number: 5,454,068

[45] Date of Patent: Sep. 26, 1995

[54] SCIENTIFIC VISUALIZATION SYSTEM

[75] Inventor: Gopalan Ramanujam, Kingston, N.Y.

[73] Assignee: International Business Machines Corporation, Armonk, N.Y.

[21] Appl. No.: 222,512

[22] Filed: Apr. 4, 1994

Related U.S. Application Data

[63] Continuation of Ser. No. 660,467, Feb. 25, 1991, abandoned.

[51] Int. Cl.$^6$ ............................................. G06F 15/72
[52] U.S. Cl. .................... 395/119; 395/120; 395/140; 364/578
[58] Field of Search ...................... 395/120, 119, 395/126, 121, 140, 123, 127, 124; 364/578

[56] References Cited

U.S. PATENT DOCUMENTS

| | | | |
|---|---|---|---|
| 3,889,107 | 6/1975 | Sutherland | 235/152 |
| 4,631,690 | 12/1986 | Corthout et al. | 364/518 |
| 4,685,070 | 8/1987 | Flinchbaugh | 395/124 |
| 4,757,461 | 7/1988 | Stohr et al. | 364/518 |
| 4,766,556 | 8/1988 | Arakawa | 395/124 |
| 4,775,946 | 10/1988 | Anjyo | 364/522 |
| 4,788,399 | 11/1988 | Evans et al. | 364/300 |
| 4,812,988 | 3/1989 | Duthuit et al. | 364/522 |
| 4,821,210 | 4/1989 | Rumbaugh | 364/518 |
| 4,855,934 | 8/1989 | Robinson | 364/521 |
| 4,862,391 | 8/1989 | Ohhashi | 364/522 |
| 4,888,712 | 12/1989 | Barkans et al. | 364/522 |
| 4,897,805 | 1/1990 | Wang | 364/521 |
| 4,958,305 | 9/1990 | Piazza | 364/522 |
| 5,067,101 | 11/1991 | Kunikiyo et al. | 364/578 |
| 5,101,363 | 3/1992 | Rutkowski | 364/578 |
| 5,113,490 | 5/1992 | Winget | 395/119 |
| 5,150,457 | 9/1992 | Behm et al. | 395/120 |
| 5,201,035 | 4/1993 | Stytz | 395/119 X |
| 5,222,202 | 6/1993 | Koyamada | 395/123 |
| 5,309,550 | 5/1994 | Takahashi | 395/121 |

OTHER PUBLICATIONS

Brotz, "Intersecting Polyhedra with Successive Planes", Computer & Graphics, vol. 2, 1976 pp. 1–6.
Dobkin, et al., "Fast Detection of Polyhedral Intersection", Theoretical Computer Science, 1983, pp. 241–253.
Dobkin et al., "Space Searching for Intersecting Objects", Journal of Algorithms, 1987, pp. 348–361.

(List continued on next page.)

*Primary Examiner*—Raymond J. Bayerl
*Attorney, Agent, or Firm*—Mark S. Walker; William A. Kinnaman, Jr.

[57] ABSTRACT

A 3D scientific visualization system for viewing models composed of polyhedra or other elements having vertices at which analysis results (e.g., temperature or pressure) are defined. The model is viewed either in a cutting plane or as a contour surface in which a given result assumes a specified value. Polygons making up an intersection surface formed by the intersection of the cutting plane or contour surface with the polyhedra forming the model are generated and passed to a polygon processor for rendering and display on a raster-scan device. A series of intersection surfaces are generated for display by varying either the position of the cutting plane along its normal or the value that the result assumes on the contour surface. The testing of elements for possible intersection by the cutting plane or contour surface is speeded up by presorting the elements into zones, based upon either the position of each element along the cutting plane normal or the value of the result over the vertices of the element, and testing only elements within certain zones for intersection with the plane or surface. Intersection calculations for edges shared by multiple elements are minimized by maintaining a global list of edges and flagging those edges whose intersection point with the cutting plane or contour surface has been calculated for any element of the model. The outer surfaces are identified for viewing in an alternative mode of operation by counting the elements sharing a given face of the model and flagging as outer faces those faces associated with only a single element.

15 Claims, 19 Drawing Sheets

OTHER PUBLICATIONS

Lorensen et al., "Marching Cubes: A High Resolution 3D Surface Construction Algorithm", Computer Graphics, vol. 21, Jul. 1987, pp. 163–169.

Upson et al., "The Applicaiton Visualization System: A Computational Environment for Scientific Visualization", IEEE Computer Graphics & Applications, 1989, pp. 30–42.

Gallagher et al., "An Efficient 3-D Visualization Technique for Finite Element Models and other Coarse Volumes", Computer Graphics, Siggraph 1989, pp. 185–194.

Appel et al., "Determining Intersection Lines of Intersecting Polyhedra", IBM TDB, vol. 14, Jun. 1971, pp. 70–73.

LIST OF INTERSECTING EDGES

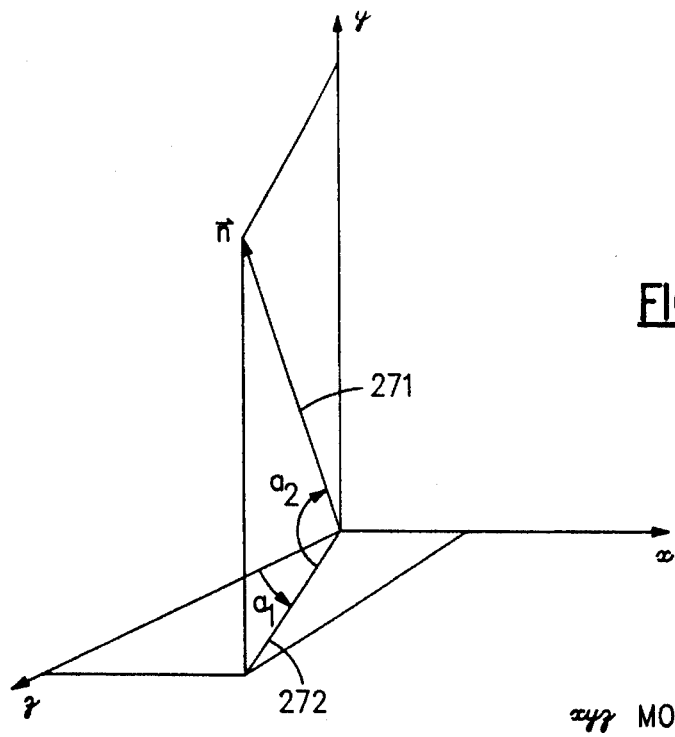
FIG. 27
*xyz* MODEL COORD.
XYZ TRANSFORMED COORD.
$\vec{n}$ IS NORMAL TO CUTTING PLANE
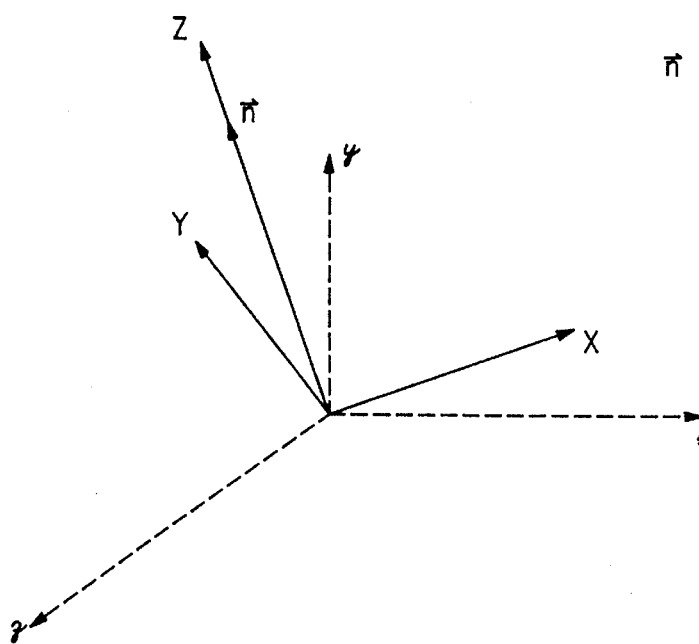
FIG. 28
$$\begin{Bmatrix} X \\ Y \\ Z \end{Bmatrix} = \begin{bmatrix} \cos a_1 & 0 & -\sin a_1 \\ \sin a_1 \sin a_2 & \cos a_2 & \cos a_1 \sin a_2 \\ \sin a_1 \cos a_2 & -\sin a_2 & \cos a_1 \cos a_2 \end{bmatrix}^T \begin{Bmatrix} x \\ y \\ z \end{Bmatrix}$$
TRANSFORMATION MATRIX
FIG. 29

PROCESS PLANE & MODEL INTERSECTION

NOTE: 1. AFTER TRANSFORMATION, Z DIRECTION IS PARALLEL TO CUTTING PLANE NORMAL.
2. PLANE MOVES IN A DIRECTION PARALLEL TO ITS NORMAL.

SCIENTIFIC VISUALIZATION SYSTEM

This is a continuation of application Ser. No. 07/660,467 filed Feb. 25, 1991, now abandoned.

BACKGROUND OF THE INVENTION

1. Field of the Invention

The present invention relates to a scientific visualization system and, more particularly, to a system for visualizing in three dimensions the results of finite-element or finite-difference analysis.

2. Description of the Related Art

Finite-element and finite-difference methods are used in such areas as stress or thermal analysis of three-dimensional (3D) mechanical parts or fluid flow analysis around a solid object or within an object. These analysis techniques model the object or the domain of interest as a collection of polyhedra (called elements) that together form the object of interest. During or after the analysis, results are generated at the corners (called nodes or vertices) of all the polyhedra. Example of results at the nodes are stresses, temperature, fluid velocity components and fluid pressures. In complex models the number of polyhedra can reach into the hundreds or thousands. The number of nodes can easily reach into the thousands. The problem is how to graphically visualize and interpret the generated results at these nodes located in the 3D space efficiently and interactively.

One visualization technique involves intersecting the model with a user-defined plane and showing the results as color-coded Gouraud-shaded polygons on the intersection plane. (Gouraud shading is a technique whereby, given the colors at the corners of a polygon, the interior of the polygon is filled with colors that are a linear combination of the colors that are at the corners.) Usually the plane is translated along a straight-line path interactively and the changing results on the plane are shown.

Another useful technique is to draw all points in a model that represent a constant value of some analysis variable. In general this could result in a surface or several unconnected surfaces within the model. These surfaces are called iso-surfaces or contour surfaces. One may also wish to study how one analysis variable changes over a single contour surface of another variable. The use of these contour surfaces can be understood in the following context: Consider all points within a mechanical part that are at a design stress level. This contour surface divides the parts into various regions. Some of these regions will be below the design stress level while others will be above it. The contour surface then gives a visual cue to the designer as to which regions must be redesigned. In addition, observing the evolution of contour surfaces (watching the surfaces deform as one marches up and down the possible contour values) can provide additional clues to the understanding of a solution to a problem (especially a fluid flow problem).

Another problem in scientific visualization systems of this sort is how to extract only the outer face of a given set of polyhedra. There are two uses for extracting this information. First, one can draw the outer faces in transparency to show a shaded model without drawing all the other faces inside. Second, if one wishes to see results only on the outside of the model, the Gouraud-shaded outer faces alone need to be drawn. All the results of faces inside the model will be hidden and thus need not be considered for rendering.

SUMMARY OF THE INVENTION

The present invention, in its various aspects, relates to a 3D scientific visualization system for viewing models composed of polyhedra or other elements having vertices at which analysis results (e.g., temperature or pressure) are defined. The model is viewed either in a cutting plane or as a contour surface in which a given result assumes a specified value. Polygons making up an intersection surface formed by the intersection of the cutting plane or contour surface with the polyhedra forming the model are generated and passed to a polygon processor for rendering and display on a raster-scan device. A series of intersection surfaces are generated for display by varying either the position of the cutting plane along its normal or the value that the result assumes for the contour surface.

In accordance with one aspect of the present invention, the testing of elements for possible intersection by the cutting plane or contour surface is speeded up by presorting the elements into zones, based upon either the position of each element along the cutting plane normal or the value of the result over the vertices of the element, and testing only element within certain zones for intersection with the plane or surface. Preferably, in the cutting plane version of the present invention, the zones are defined by first transforming the original model coordinates to transformed XYZ coordinates in which the cutting plane normal is parallel to the Z axis. Each element is then associated with one or more zones, based upon the Z components of its vertices.

Various ways of defining the zones and assigning elements of the model to zones are contemplated. One method is to define the zone sizes independently of the model, each zone encompassing a predetermined range of positions along the cutting plane normal or values of a given result. Preferably, however, the zone sizes are based upon the model being visualized. Thus, in the cutting plane version of the present invention, each zone is defined to have a Z extent (in the transformed coordinate system parallel to the cutting plane normal) equal to the maximum Z extent of any element of the model. Each element is then assigned to a single zone, based upon a suitable vertex statistic such as the average of the maximum and minimum Z coordinates of the element vertices. Similarly, in the contour version of the present invention, each zone is defined to have a range of the result variable equal to the maximum range of the result over any element of the model. Each element is then assigned to a zone, based upon the values of the result at the vertices of the element.

By virtue of such a system of zone definition and assignment, it is possible to limit the search for elements intersected by the cutting plane or contour surface to the current zone (the zone encompassing the current value of the cutting plane position or result variable), together with the two adjacent zones. Since an actual model may comprise many layers of elements, this ability to limit the intersection search in effect to three layers of elements significantly increases the efficiency of the search process. This efficiency is further enhanced by the use of a data structure organized by zones. In such a case, only those elements in the current zone and two bracketing zones are examined, and the remaining elements of the model need not be looked at, even to ascertain their zone assignment.

In accordance with another aspect of the present invention, intersection calculations for edges shared by multiple elements are minimized by maintaining a global list of edges and flagging those edges whose intersection points with the cutting plane or contour surface have been calculated for any element of the model. Each edge of an element possibly intersecting the cutting plane or contour surface is tested, and only those edges whose flags indicate that intersections have not been calculated are processed further. This again significantly increases the efficiency of the intersection procedure, since edges are generally shared by a multiplicity of elements and would otherwise be processed redundantly for each of them. This method is facilitated by the use of a data structure in which each entry in an element array contains pointers to entries in a global edge array, thereby permitting several element entries to share the same edge data, including intersection calculations.

In accordance with yet another aspect of the present invention, the outer surfaces of the elements that make up the outer surface of the model are identified for viewing in an alternative mode of operation by counting the elements sharing a given face of the model and flagging as outer faces those faces associated with only a single element.

Still other aspects of my invention relate to the connection of intersection points to form intersection polygons, as well as the visualization of a second result on a contour surface defined by a first result, as described more particularly below.

BRIEF DESCRIPTION OF THE DRAWINGS

FIG. 27 is a perspective view defining the orientation of the cutting plane normal relative to the x, y and z model coordinates.

FIG. 28 is a perspective view of a transformed coordinate system in which the normal to the cutting plane is parallel to the Z axis.

FIG. 29 shows the transformation matrix used to obtain the transformed coordinates from the original model coordinates shown in FIG. 27.

DESCRIPTION OF THE PREFERRED EMBODIMENTS

1. Overview

As has already been noted above, the present invention encompasses two principal versions. In the first, a cutting plane is intersected with the model to create an intersection surface which is displayed. In the second, the surface that is displayed is a contour surface passing through the model in which a given result is constant. Since the realization of these two applications is generally quite similar, they will be discussed in an interleaved manner, with differences between the two being noted as they arise.

The endpoints of the edges of the models discussed herein are variously referred to as "nodes" and "vertices". As used in this specification, the two terms are synonymous. The term "element" however has a broader meaning than "polyhedron", since an element can also be a planar entity such as a polygon. Such two-dimensional elements arbitrarily oriented in 3D space are useful for modeling such structures as the blades of turbines (whose shafts are modeled by polyhedra), in which the primary inquiry is how the result varies along the surface of the two-dimensional elements being modeled. Although the elements discussed in this specification are generally polyhedra, it will be apparent that the concepts of sorting by zones and flagging of intersected edges are also applicable to two-dimensional elements such as polygons which are arbitrarily oriented in 3D space.

a. Cutting Plane Version

Figure 1:
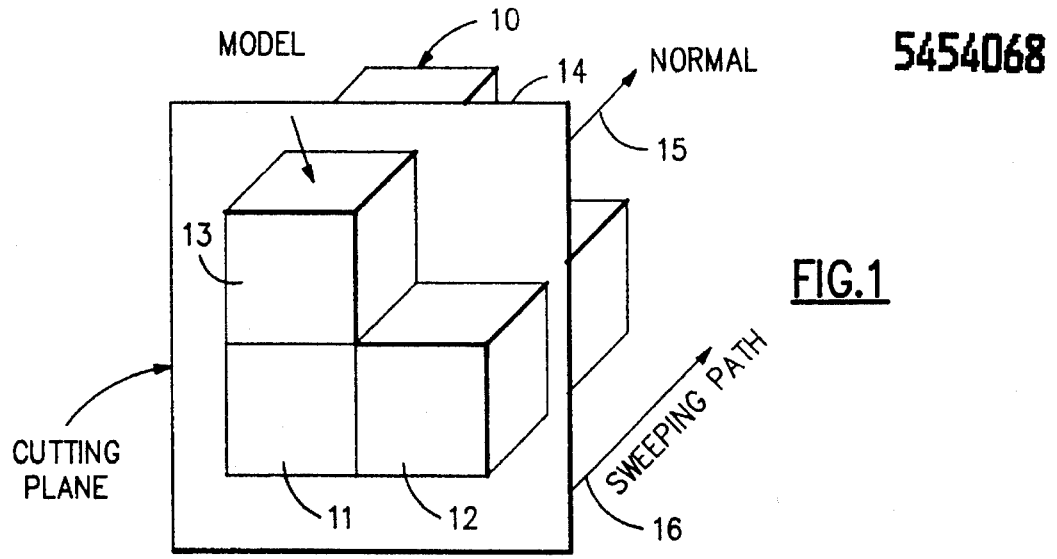
FIG. 1 is a perspective view of a model composed of polyhedra that is intersected by a cutting plane.
Figure 2:
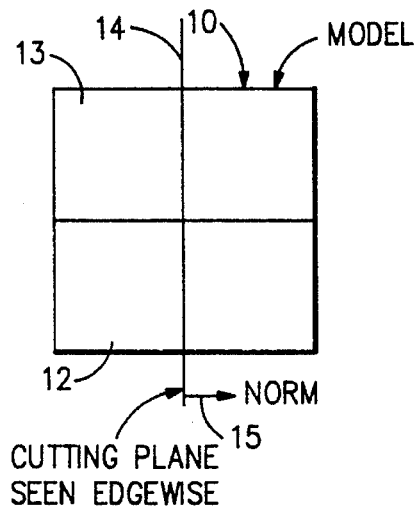
FIG. 2 is a view of the model shown in FIG. 1, as seen edgewise from the cutting plane.

One version of the present invention takes a plane (designated as the cutting plane and specified by a normal) and sweeps it through the object along a line parallel to the cutting plane normal. Thus, referring to FIGS. 1 and 2 a model 10 comprising polyhedra 11, 12 and 13 is intersected by a cutting plane 14, which is moved along a sweeping path 16 parallel to the cutting plane normal 15. Interpolated results on the cutting plane 14 are then displayed as Gouraud-shaded polygons. (As noted above, a Gouraud-shaded polygon is a polygon whose interior is filled with colors such that the color at any point inside the polygon is a linear combination of colors at its vertices). At any position on the sweeping path 16, the cross section of the model 10 on the cutting plane 14 is obtained. Since the model 10 is composed of polyhedra, the cross-sections generated on the cutting plane 14 are polygons. Thus, referring to FIG. 3, cutting plane 14 intersects the polyhedra 11–13 making up model 10 to form respective polygons 31, 32 and 33 in the cutting plane.

Figure 3:
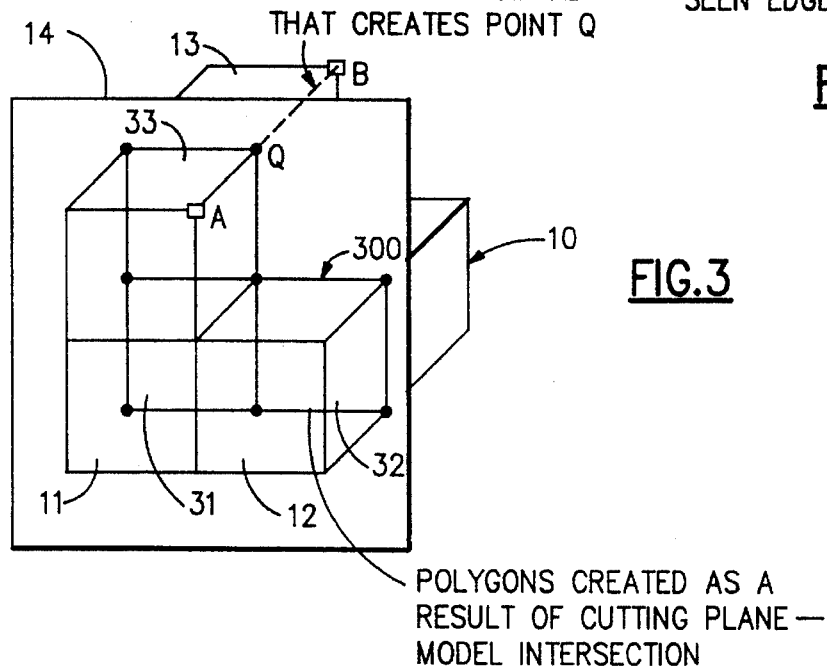
FIG. 3 is another view of the model shown in FIG. 1, illustrating the polygons formed by the intersection of the cutting plane with the model.
Figure 4:
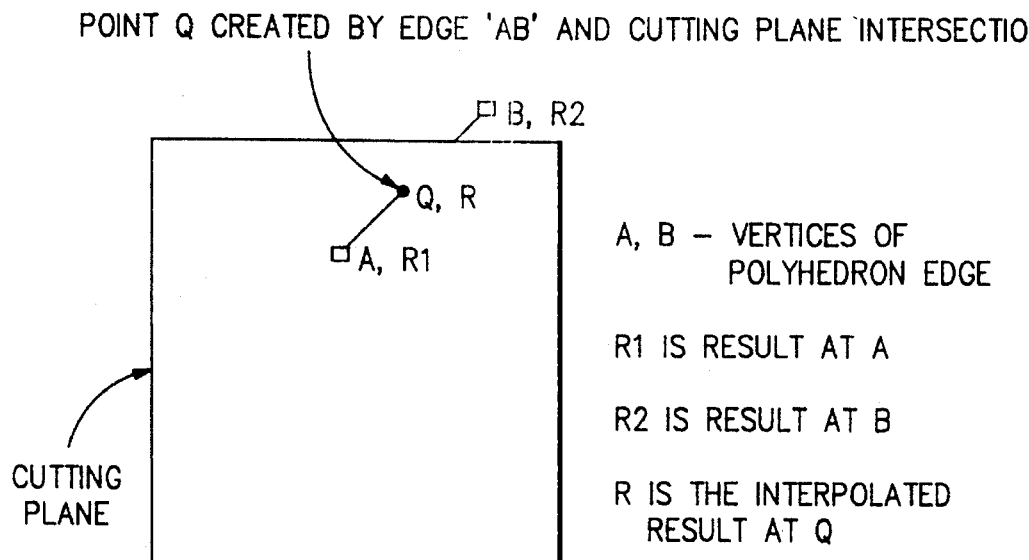
FIG. 4 depicts an intersection point formed by the cutting plane shown in FIGS. 1-3.

Next, a value of the result to be visualized is associated with each polygon vertex in the cutting plane As shown in FIG. 3, the vertices of polygons 31–33 on the cutting plane 14 are obtained by intersecting the edges of polyhedra 11–13 with the cutting plane. The result value associated with a polygon vertex in the cutting plane 14 is obtained by interpolating the results available on the nodes of the polyhedron edge that created the polygon vertex. Thus, as shown in FIG. 4, the intersection of edge AB of polyhedron 13 (FIG. 3) with cutting plane 14 consists of the point Q. Since the analysis result is assumed to be linear between any two vertices, the result R for the intersection point Q is calculated from the results R1 and R2 at endpoints A and B by linear interpolation, a standard technique. When the results R for the various intersection points Q are color coded, polygons 31–33 with color values at the vertices are available on the cutting plane 14. These polygons are then graphically rendered as Gouraud-shaded polygons, in a manner that is well known in the art. By sweeping the cutting plane 14 through the entire model 10 and observing the shaded polygon colors, one is able to visualize and interpret the results. Although cutting plane 14 as shown in FIGS. 1–4 is parallel to the faces of the polyhedra 11–13, this is not a necessary condition and in general the cutting plane can be arbitrarily oriented.

b. Contour Surface Version

Figure 5:
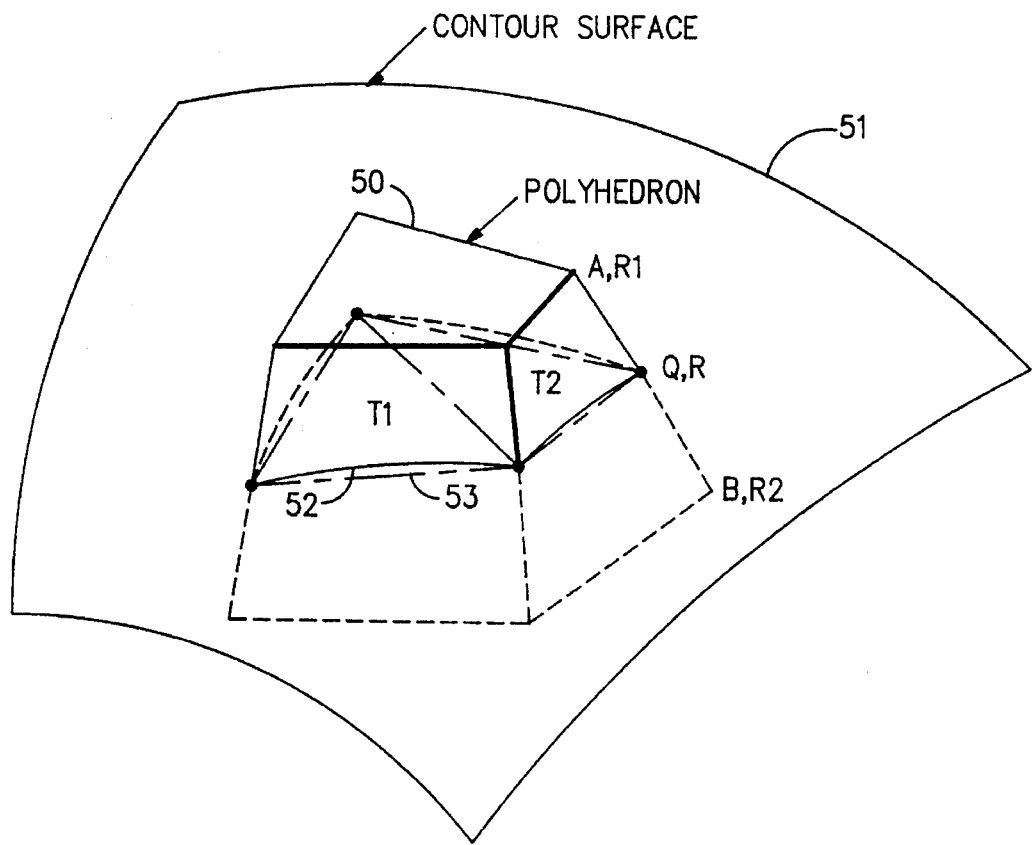
FIG. 5 shows the intersection of a contour surface with a polyhedron of a model.

The other version of the present invention, as already noted, involves the determination of the intersection of a contour surface, in which a given result is constant, with the polyhedra forming the model. FIG. 5 shows the intersection of an ideal contour surface 51, representing a continuum of points in which the result takes on a given value, with a polyhedron 50 of a model (not shown). As shown in the figure, the intersection 52 of the polyhedron 50 with the contour surface 51 is a closed curve 52 consisting generally of curvilinear segments, Since, in the model under consideration, the result is defined only at the vertices of the polyhedron 50, the ideal intersection 52 is approximated by a closed polyline 53 having vertices on the edges of the polyhedron 50 that are intersected by the contour surface 51. The location of each intersection point along the polyhedron edge is calculated by interpolation, in a manner similar to that for the cutting plane shown in FIGS. 3 and 4. Thus, considering the polyhedron edge having end points A and B in FIG. 5, if the value of the result is R1 at point A and R2 at point B, the location of the intersection point Q on line AB, given the value R of the result on the contour surface, is calculated by a straightforward method of interpolation. Since in general the closed polyline 53 is not a planar figure, it is triangulated, that is, divided into triangles, such as the triangles T1 and T2 shown, which are supplied to a polygon processor to be shaded.

In many instances, the locus of the contour surface will itself be the object of inquiry, without regard to the variations of any particular result over that surface. (The result defining the contour surface is, of course, constant over that surface.) In other instances, the object of inquiry is the behavior of a second result over a surface defined by a first result, for example, how temperature varies over a surface of constant pressure or vice versa. This is accomplished when desired in the system of the present invention by evaluating not only the coordinates of the intersection point (e.g. point Q in FIG. 5), but also the value of a selected result other than the result defining the contour surface. This result is included in the vertex data defining the polygons, as in the cutting plane version, so that the polygons generated may be rendered with Gouraud shading indicating the value of a second result over a surface defined by a first result.

2. Apparatus

Figure 6:
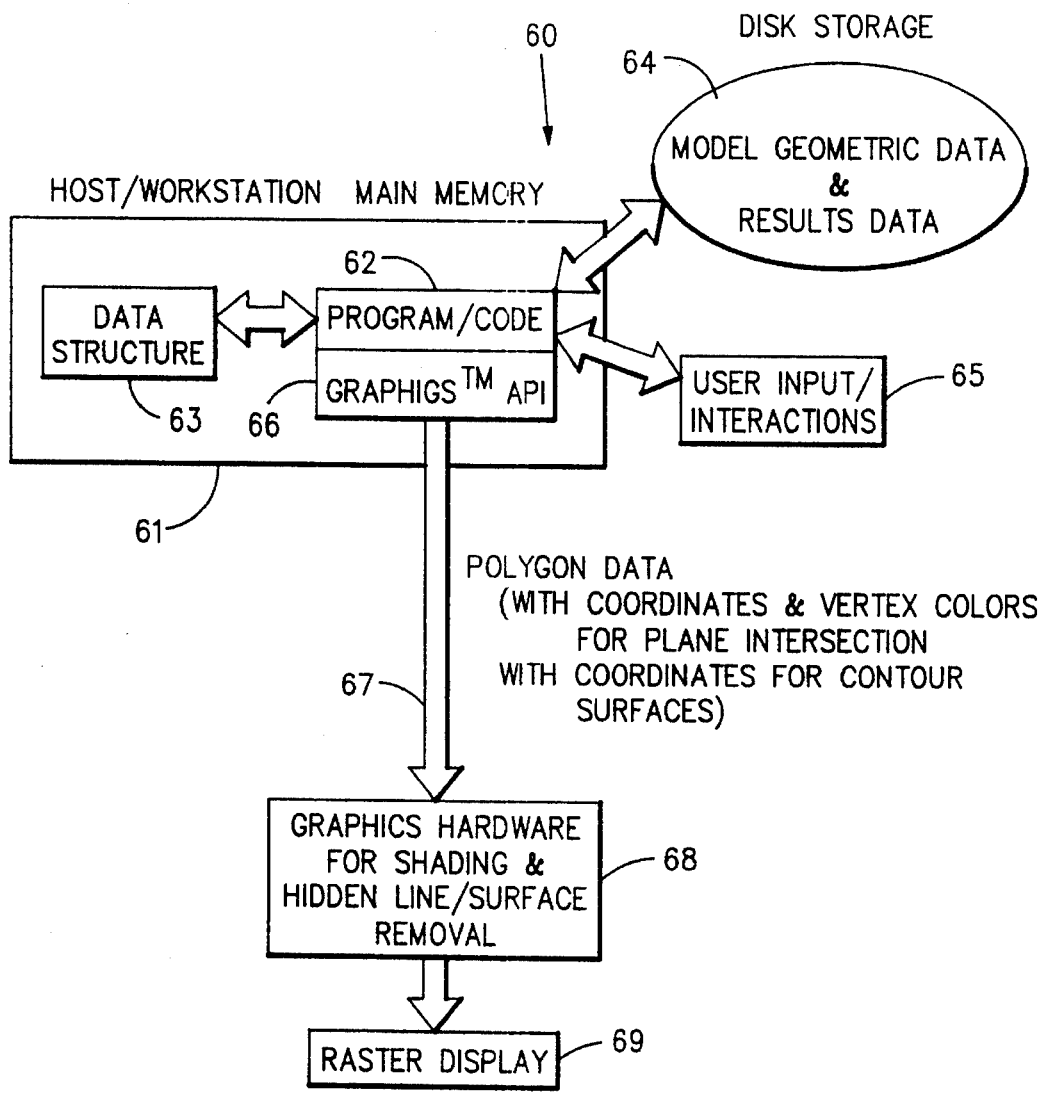
FIG. 6 is a schematic diagram of a graphics system that may be used to practice the present invention.

FIG. 6 depicts, at the system level, an apparatus that may be used to perform the present invention. As shown in FIG. 6, this system 60 includes a main processor and memory ("host/workstation"), indicated collectively by the reference number 61, in which resides the visualization program or code 62 and data structure 63 on which the code 62 operates. The program 62 receives model geometric data and results data for the model vertices from suitable secondary storage 64, such as disk storage, as well as user input from input devices 65 such as a keyboard, dials (not separately shown) or the like. The program 62 takes the data 64 from secondary storage and converts it, in a manner to be described, to the data structure 63 that is directly used by the program. Polygon data generated by program 62 is outputted through a suitable progamming interface, such as the graPHIGS (trademark of IBM Corporation) interface, on a line or bus 67.

The polygon data consists of coordinates and vertex colors for the plane intersection. In the case of contour surfaces, the polygon data consists of coordinates for the contour surfaces together with the values of the second result, if any, that is being visualized in the surface defined by the first result. This data is supplied via line 67 to a polygon processor 68 of any suitable type known to the art.

Polygon processor 68 converts the high-level polygon data supplied from interface 66 to pixel data of the type that may be displayed on a raster display 69, such as a CRT display, in which successive lines of the image are scanned. Polygon processor 68 contains suitable graphics hardware or microcode for shading and hidden-line or-surface removal.

3. Initial Data a. Format

Figure 7:
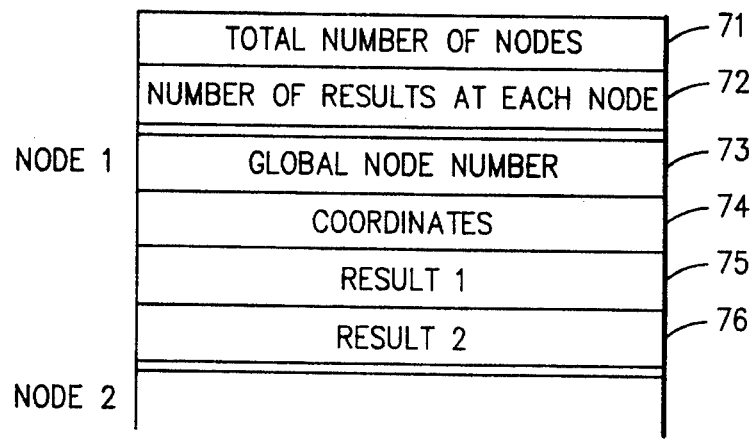
FIG. 7 shows the format of the initial node data used in the present invention.
Figure 8:
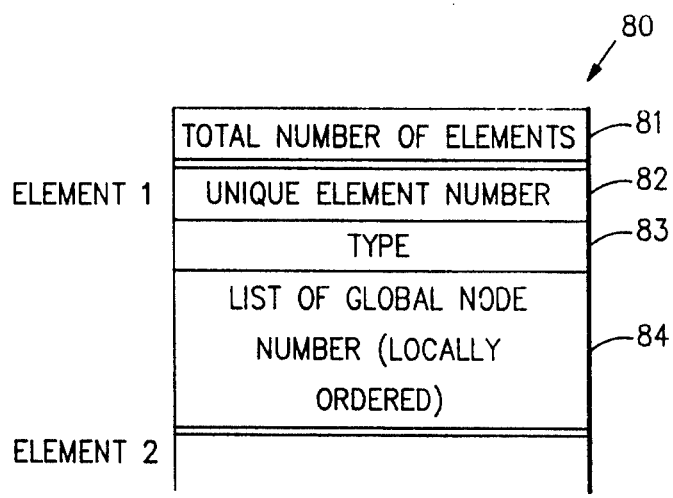
FIG. 8 shows the format of the initial element data used in the present invention.
Figure 10:
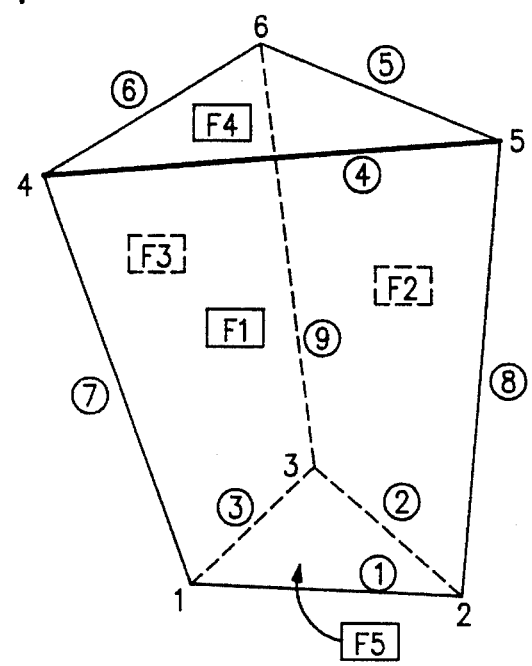
FIG. 10 shows the local ordering scheme for a pentahedron.
Figure 9:
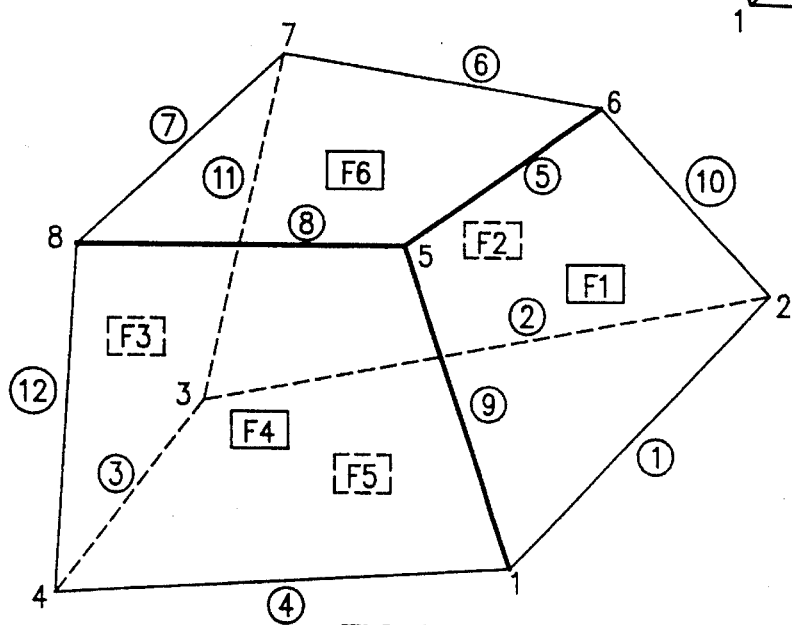
FIG. 9 shows the scheme used for locally ordering the faces, edges and vertices of a hexahedron.
Figure 11:
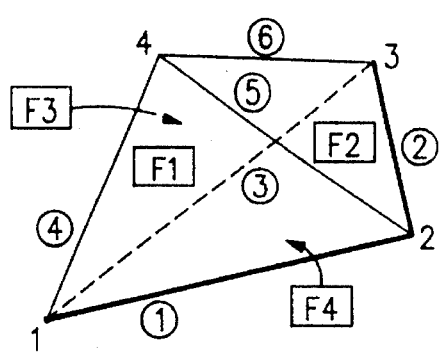
FIG. 11 shows the local ordering scheme for a tetrahedron.
Figure 12:
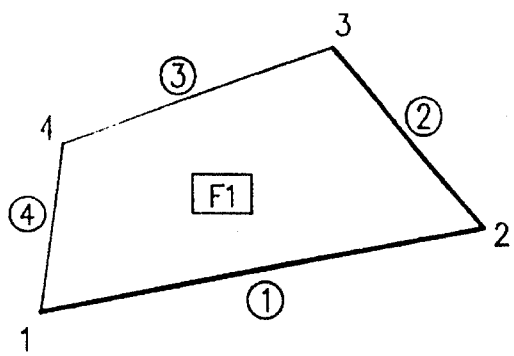
FIG. 12 shows the local ordering scheme for a quadrilateral.
Figure 13:
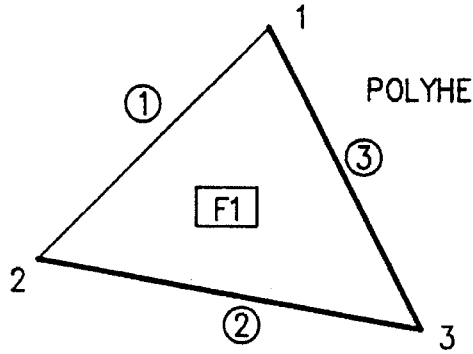
FIG. 13 shows the local ordering scheme for a triangle.

FIGS. 7 and 8 show the format of the data files used for initially storing the analysis data in storage 64. This data consists of node vertex data 70 (FIG. 7) and polyhedron/element data 80 (FIG. 8). Referring first to FIG. 7, the node/vertex data file 70 is prefaced by a first header portion 71 indicating the total number of nodes and a second header portion 72 indicating the number of results (quantities such as stress, temperature or the like) for each node. These header portions are followed by global node entries ("global" in the sense that there is one and only entry for each node of the model), the first of which is shown in detail in FIG. 7. Each node entry consists of a unique global node number (73), the x, y and z model coordinates of the node (74), and results associated with that node, such as RESULT 1 (75) and RESULT 2 (76) in the entry shown.

Referring now to FIG. 8, the polyhedron/element data file 80 has a header portion 81 indicating the total number of elements. This header portion is followed by entries, one for each polyhedron/element of the model, the first of which is shown in detail in FIG. 8. Each polyhedron/element entry contains fields indicating the unique element number (82), the element type (83), and a list 84 of the global node numbers (73) of the nodes that make up this element, specified in the local ordering scheme (see below) for that particular element.

The element "type", for the purposes of the data structures disclosed herein, is the topological element type, as determined by the number and connectivity of the planar faces, linear edges and vertices, and not simply the number of faces as reflected by a particular designation of an element as a "hexahedron" or the like. Thus, while one type of hexahedron, such as a cube, may have quadrilateral faces, another type of hexahedron, formed by joining two tetrahedra, may have triangular faces. Each of these hexahedra represents a distinct element type and would receive a distinctive type identification in the data structures used herein.

b. Topological Assumptions

Referring now to FIGS. 9–13, data files 70 and 80 assume a certain ordering of the faces, edges and vertices associated with each element specified in the files. By virtue of such a local ordering, faces and edges can be generated from a listing of vertices by inspection, without having to examine the actual coordinates of the vertices to determine their connectivity. Thus, considering the hexahedron shown in FIG. 9, if the lists of global node numbers (84) characterizing that hexahedron are arranged in the order shown in the figure, it will be known without further investigation that vertices 2 and 6 define an edge (edge 10 in this example) or that vertices 1, 4, 8 and 5 (or edges 4, 9, 8 and 12) define a face (face 4 in this example). This topology information is also shown in tabular form in Tables 1–5, reproduced below, which correspond to FIGS. 9–13, respectively. (Tables 1 . 5 do not show the linking of faces and nodes, however, this is part of the local ordering scheme, as shown in FIGS. 9–13).

Although five element types are shown in FIGS. 9–13 and Tables 1–5, it will be apparent that other topological element types could be defined if desired in this visualization system.

TABLE 1

Topology Information for Hexahedron

| Local Edge | Local Faces Sharing Local Edge | Local Face | Number of Edges | Local Edges That Make Up Local Face |
|---|---|---|---|---|
| 1 | 1, 5 | 1 | 4 | 1, 5, 9, 10 |
| 2 | 2, 5 | 2 | 4 | 2, 6, 10, 11 |
| 3 | 3, 5 | 3 | 4 | 3, 7, 11, 12 |
| 4 | 4, 5 | 4 | 4 | 4, 8, 9, 12 |
| 5 | 1, 6 | 5 | 4 | 1, 2, 3, 4 |
| 6 | 2, 6 | 6 | 4 | 5, 6, 7, 8 |
| 7 | 3, 6 | | | |
| 8 | 4, 6 | | | |
| 9 | 1, 4 | | | |
| 10 | 1, 2 | | | |
| 11 | 2, 3 | | | |
| 12 | 3, 4 | | | |

TABLE 2

Topology Information for Pentahedron

| Local Edge | Local Faces Sharing Local Edge | Local Face | Number of Edges | Local Edges That Make Up Local Face |
|---|---|---|---|---|
| 1 | 1, 5 | 1 | 4 | 1, 4, 7 8 |
| 2 | 2,5 | 2 | 4 | 2, 5, 8, 9 |
| 3 | 3, 5 | 3 | 4 | 3, 6, 7, 9 |
| 4 | 1, 4 | 4 | 3 | 4, 5, 6 |
| 5 | 2, 4 | 5 | 3 | 1, 2, 3 |
| 6 | 3, 4 | | | |
| 7 | 1, 3 | | | |
| 8 | 1, 2 | | | |
| 9 | 2, 3 | | | |

TABLE 3

Topology Information for Tetrahedron

| Local Edge | Local Faces Sharing Local Edge | Local Face | Number of Edges | Local Edges That Make Up Local Face |
|---|---|---|---|---|
| 1 | 1, 4 | 1 | 3 | 1, 4, 5 |
| 2 | 2, 4 | 2 | 3 | 2, 5, 6 |
| 3 | 3, 4 | 3 | 3 | 3, 4, 6 |
| 4 | 1, 3 | 4 | 3 | 1, 2, 3 |
| 5 | 1, 2 | | | |
| 6 | 2, 3 | | | |

TABLE 4

Topology Information for Quadrilateral

| Local Edge | Local Faces Sharing Local Edge | Local Face | Number of Edges | Local Edges That Make Up Local Face |
|---|---|---|---|---|
| 1 | 1 | 1 | 4 | 1, 2, 3, 4 |
| 2 | 1 | | | |
| 3 | 1 | | | |

TABLE 4-continued

Topology Information for Quadrilateral

| Local Edge | Local Faces Sharing Local Edge | Local Face | Number of Edges | Local Edges That Make Up Local Face |
|---|---|---|---|---|
| 4 | 1 | | | |

TABLE 5

Topology Information for Triangle

| Local Edge | Local Faces Sharing Local Edge | Local Face | Number of Edges | Local Edges That Make Up Local Face |
|---|---|---|---|---|
| 1 | 1 | 1 | 3 | 1, 2, 3 |
| 2 | 1 | | | |
| 3 | 1 | | | |

Figure 14:
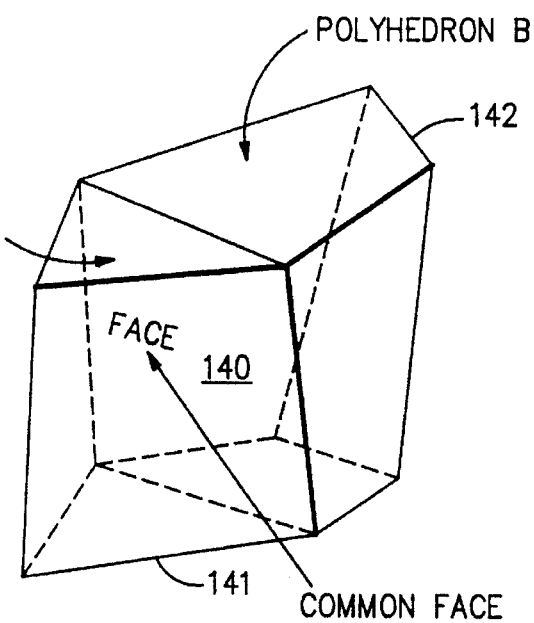
FIG. 14 shows a pair of polyhedra sharing a common face.

Another assumption made in the model, for purposes to be described below, is that each interior face of the model is common to two polyhedra and no more. Thus, in FIG. 14, polyhedra 141 and 142 are shown having a common face 140. On the other hand, in general an edge may be shared by many more than two polyhedra. Thus, referring to FIG. 15, an edge 150 is shown being shared by three polyhedra, polyhedra 151, 152 and 153. This many-to-one relationship of polyhedra to edges is relevant to the intersection calculations in a manner to be made clear below.

4. Working Data Structures

Figure 16:
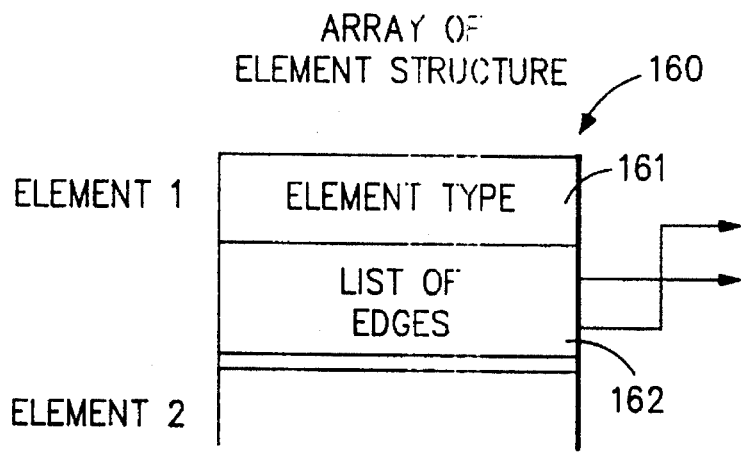
FIG. 16 shows the element array of the data structure used in the present invention.
Figure 17:
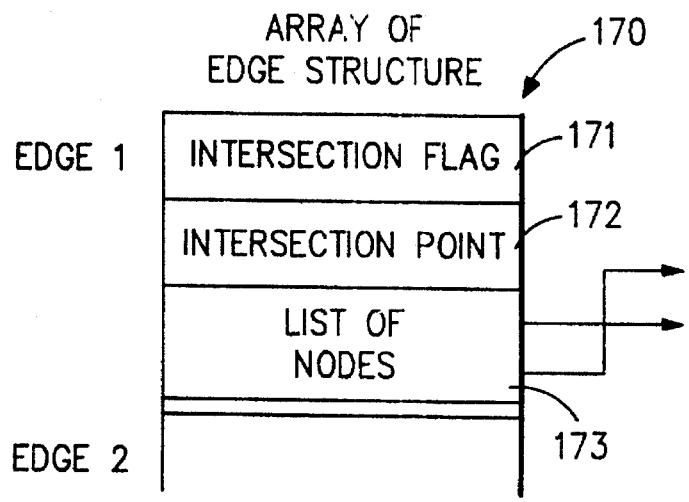
FIG. 17 shows one type of edge array used in the present invention.
Figure 18:
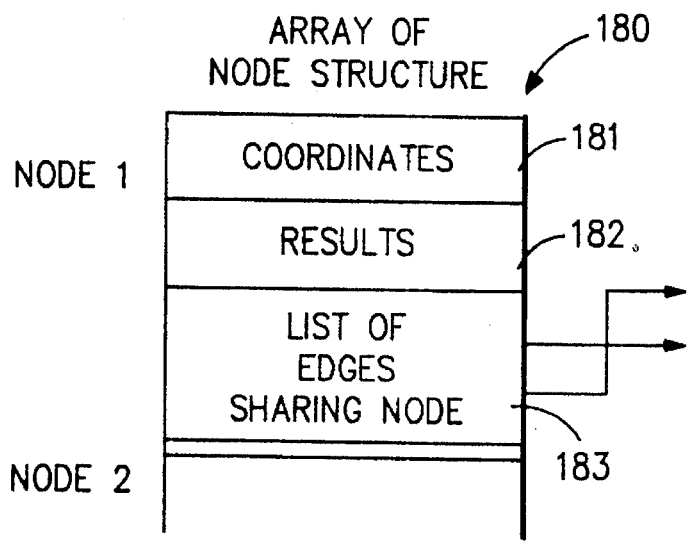
FIG. 18 shows the node array used in the present invention.

The data files 70 and 80 contained in secondary storage 64 are converted to working data structures residing in main memory, which the program 62 (FIG. 6) uses to generate the desired sections or contour surfaces. FIGS. 16–18 show an element array ("array of element structure") 160, an edge array ("array of edge structure") 170, and a node array ("array of node structure") 180.

Element array 160 (FIG. 16) contains one entry for each element (polyhedron or polygon) of the model. Each entry contains a first portion 161 indicating the topological element type (whether it is a hexahedron, tetrahedron, etc.) followed by a list 162 of pointers to entries in an edge array 170 (FIG. 17) or 190 (FIG. 19) identifying the edges of that element. The edges in the list 162 are arranged in the local ordering scheme shown in FIGS. 9–13 and Tables 1–5 to permit faces to be identified with given edges by inspection, as will be described in further detail below.

Figure 15:
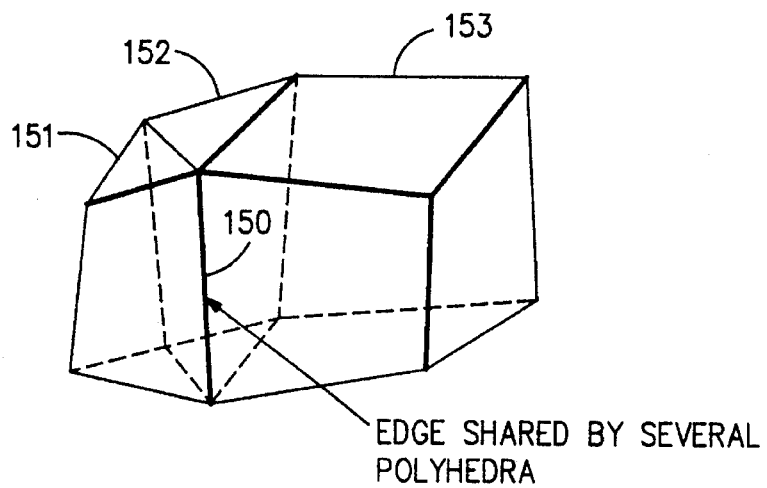
FIG. 15 shows several polyhedra sharing a common edge.

One possible edge array 170 is shown in FIG. 17. Referring to that figure, edge array 170 contains one entry for each global edge of the model. (By "global edge" is meant an edge as defined with respect to the model as a whole as opposed to a particular polyhedron of the model. A global edge may in general be the local edge of several polyhedra, as shown in FIG. 15.) Each edge entry contains a list 173 of nodes, more particularly, a pair of pointers to entries in node array 180. Each edge entry also contains an intersection flag 171 indicating whether the intersection of that edge with the cutting plane or contour surface has been evaluated, together with the coordinates 172 of the intersection point if it has been determined. The intersection flag 171 is used to speed up the intersection calculation by indicating whether the intersection point 172 has been previously generated for the same global edge, but for another polyhedron.

Referring to FIG. 18, node array 180 contains one entry for each global node of the model. In a manner similar to that of the edge array 170, a given global node can be the local node of more than one polyhedron. Each entry in the node array 180 contains the x, y, and z coordinates 181 for the particular node, together with the results 182, if any, that have been calculated for that node. Each entry also contains a list 183 of pointers to the edges in edge array 170 that share that node.

Figure 19:
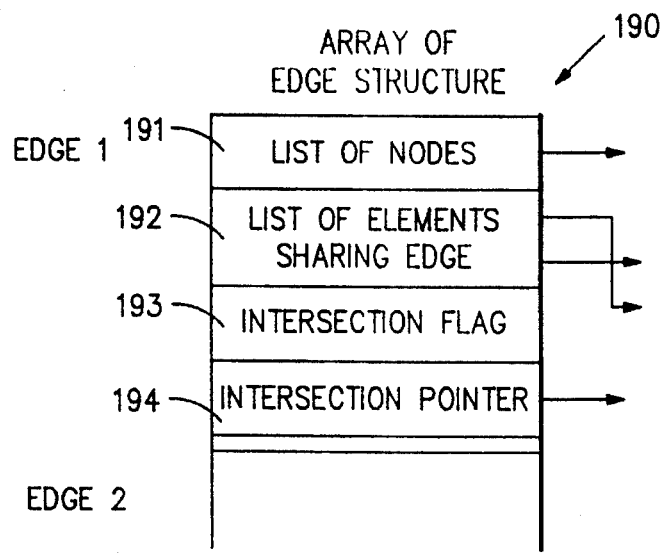
FIG. 19 shows another type of edge array used in the present invention.
Figure 20:
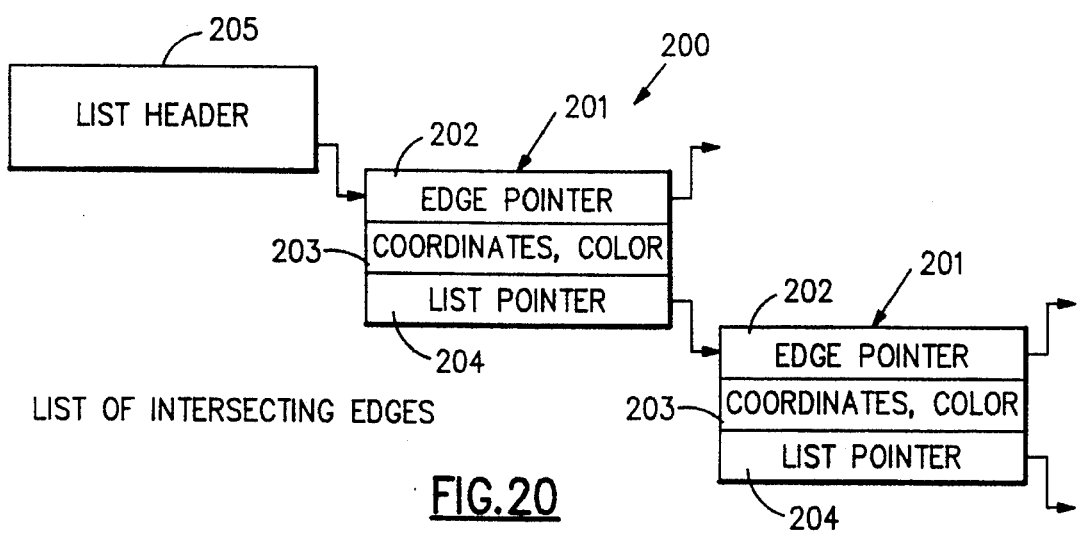
FIG. 20 shows the intersection point list used in conjunction with the edge array of FIG. 19.

A preferred edge array 190 in shown in FIG. 19. As shown in the figure, the preferred edge array 190 contains one entry for each global edge of the model, in a manner similar to that of edge array 170 (FIG. 17). Each entry in edge array 190 contains a pair of pointers 191 to the nodes in the node array 180 sharing that edge, a list 192 of pointers to elements in element array 160 sharing that edge, an intersection flag 193 similar to the intersection flag 171 of edge array 170, and an intersection pointer 194 pointing to the appropriate entry in an intersection point list 200 (FIG. 20). Referring to FIG. 20, intersection list 200 comprises a linked list containing a list header 205 followed by links 201 corresponding to respective edges of the model that are intersected by a cutting plane or contour surface. Each link 201 contains an edge pointer 202 to the corresponding entry in edge array 190 (FIG. 19), the coordinates and results, if any, for the intersection point (203), and a forward pointer to the next link 201 in the list. As is conventional, a null pointer (not shown in FIG. 20) indicates the end of the list.

Using intersection pointer 194 in this manner reduces the memory requirements, since the pointer requires much less memory space than the actual coordinates and since only a small fraction of the edges in the model will be intersected by the cutting plane or contour surface in question. The remainder of this specification will assume that edge array 190 is used rather than edge array 170. In general, however, edge array 170, with its absolute intersection values rather than intersection pointers, can alternatively be used.

Arrays 160, 190 and 180 are created at the beginning of operation from the initial element and vertex data contained in files 70 and 80 in storage 64. Intersection list 200 is created when the intersection calculations are performed for a particular cutting plane or contour surface.

Figure 21:
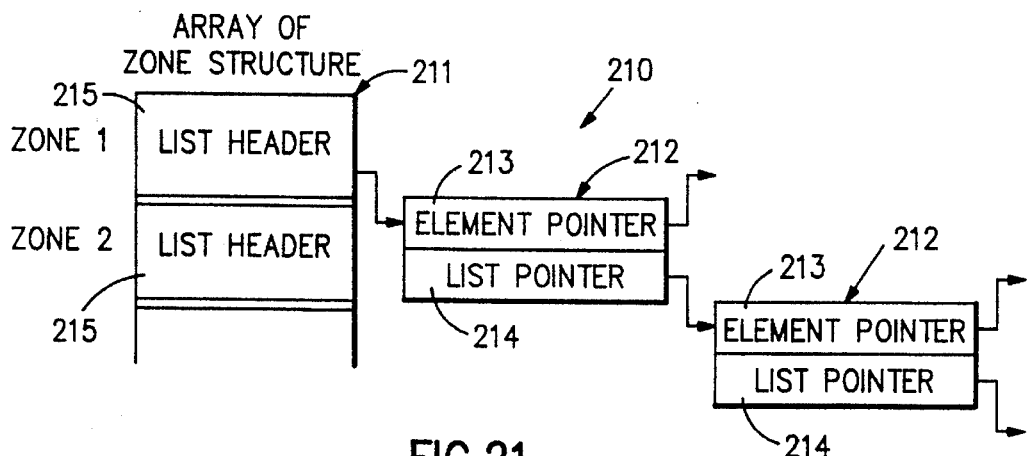
FIG. 21 shows the zone array used in the present invention.

Another array, referred to as the zone array ("array of zone structure") 210, is shown in FIG. 21. Zone array 210 is created when a cutting plane normal or contour surface variable has been selected and the elements of a model are assigned to zones, in a manner to be described below. Zone array 210 contains one entry for each defined zone. Each entry comprises a linked list consisting of a list header 215 and links 212 corresponding to the respective elements assigned to that zone. The list headers 215 for the respective zones are contained in contiguous storage locations, as shown in FIG. 21, so that a particular list can be accessed by using the zone number as an index. Each link 212 contains an element pointer 213 to the corresponding element in element array 160 (FIG. 16) and a forward pointer 214 to the next link in the chain. As with the intersection list 200 (FIG. 20), a null pointer (not shown in FIG. 21) indicates the end of a particular list in array 210.

5. General Sequence of Operation a. Cutting Plane Version

Figure 22:
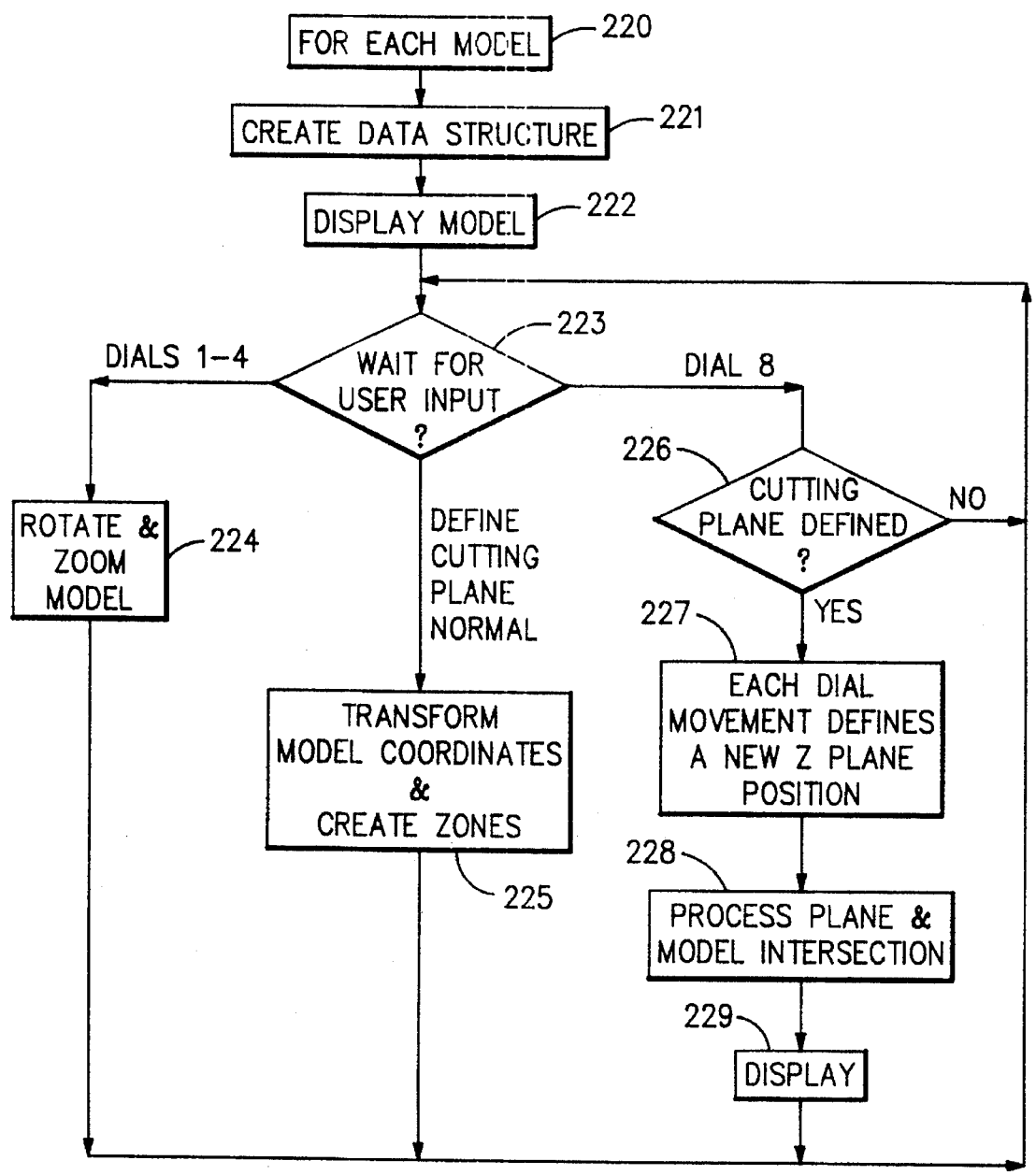
FIG. 22 is a high-level flowchart of the version of my invention used to intersect a model with a cutting plane.

FIG. 22 is a flowchart of the general sequence for visualizing models in a cutting plane. For each model to be visualized (220), the working data structures 160, 190 and 180 are created from the data files 70 and 80 residing in secondary storage 64 (221). To display the model (222), the program 62 (FIG. 6) first waits for appropriate user input (223). Such user input may include scaling of the model or rotation on one of three coordinate axes (224), the selection of a cutting plane normal, or the movement of a particular cutting plane along its normal. Upon the selection of a particular cutting plane normal, the model node coordinates are transformed and the elements are assigned to zones in a manner to be described below (225). Upon the movement of a particular cutting plane along its normal, as by rotating a dial (226 and 227), the program 62 processes the intersection between the plane and the model (228), and supplies the polygon data to the polygon processor 68 (FIG. 6) to display the results (229).

b. Contour Surface Version

Figure 23:
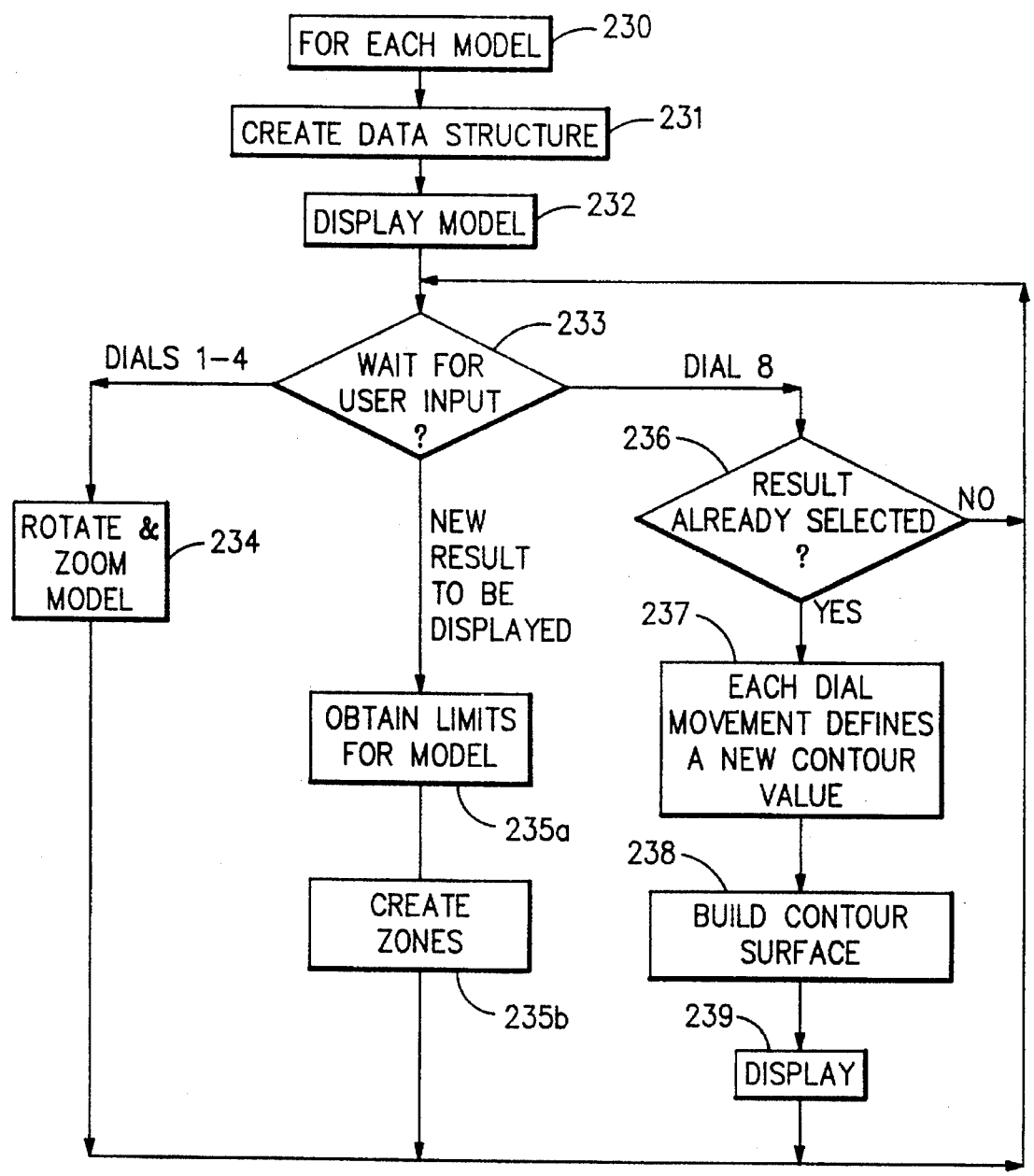
FIG. 23 is a high-level flowchart of the version of my invention used to intersect a contour surface with the polyhedra of a model.

Referring now to FIG. 23, the procedure for visualizing models along contour surfaces is generally similar to that for viewing them in cutting planes. Accordingly, the steps in FIG. 23 are generally similar to those shown in FIG. 22. There are principal differences between the two procedures. First, in the contour surface version zones are created (without any coordinate transformation) in response to the selection of a new result to be displayed (235a–235b) rather than a new cutting plane normal. Second, new intersection surfaces are built in response to the definition of a new contour value (237–238) based on dial rotations.

6. Creation of Working Data Structures

Figure 24:
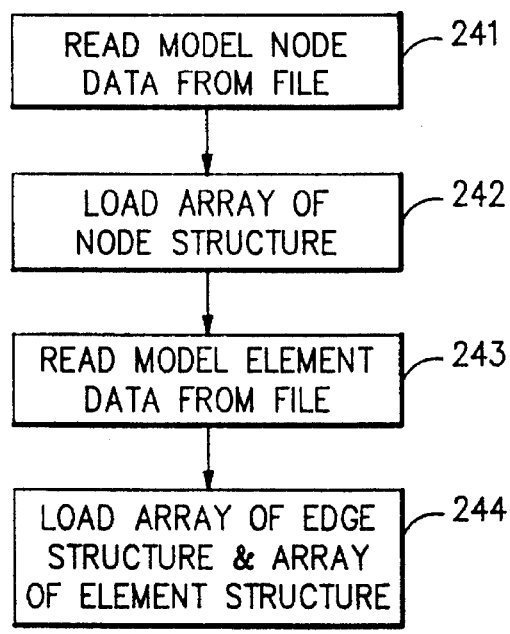
FIG. 24 is a flowchart showing in further detail the step of creating a data structure in the flowcharts shown in FIGS. 22 and 23.

FIG. 24 shows in somewhat greater detail the procedure for creating the data structures 160, 190 and 180 from the data files 70 and 80 initially provided from secondary storage 64. Referring now also to Code Listing 1, reproduced below, for each node entry in data file 70, the coordinates and results are loaded into the corresponding locations 181 and 182 of an entry created in the node array 180 (initially the node array is empty), and the list 183 of edges sharing the node for that entry is set to Empty (241–242). The program then reads each entry from the element file 80 (243) and modifies the edge array 170 or 190 and element array 160 accordingly (244), as shown more particularly in Code Listings 2 and 3, also reproduced below.

---

CODE LISTING 1

---

FOR each node in Data File DO
    read node coords & results at node;
    load this into "array of node structure";
    set "list of edges sharing node" in the "array of node
      structure" to Empty;
END FOR each node in Data File

---

CODE LISTING 2

---

FOR each element in Data File DO
  read all global node identifiers from data file;
  FOR each local edge DO
    get global node identifiers for local edge, node A &
      node B;
    IF <global edge with node A & node B exists> THEN
      add global edge pointer to "list of edges" in "array
        of element structure";
    ELSE
      create a new global edge entry in "array of
        edge structure" & put pointers for nodes A & B
        in "list of nodes ";
      go to the entries for nodes A & B in the "array
        of node structuree"; add the new global edge
        pointer to the "list of edges sharing nodes"
        for nodes A & B;
    ENDIF
  END FOR each local edge
END FOR each element in Data File

---

CODE LISTING 3

---

<global edge with node A & node B exists> test function:

Go to node A entry in "array of node structure";
IF <"list of edges sharing node" is Empty> THEN
    global edge does not exist;
    return (False);
ELSE
    FOR each edge in "list of edges sharing node" DO
      get the "list of nodes" for this edge from "array
        of edge structure", say node X & node Y;
      IF <node B and node X are same> THEN
        global edge with node A & node B exists; the
          current edge points to the location
          in "array of edge structure";
        return (True);
      ELSE
        IF <node B and node Y are same> THEN
          global edge with node A & node B exists; the
            current edge points to the location
            in "array of edge structure";
          return (True);
        ENDIF
      ENDIF
    END FOR each edge in "list of edges sharing node"
    global edge does not exist;
    return (False);
ENDIF

---

7. Zone Definition and Assignment a. Cutting Plane Version

1. General Overview

The zoning technique as it is used to determine the intersection of a model with a cutting plane will now be described. The intention of the visualization process is to find the intersection of the cutting plane with the model which is made up of polyhedra. The polyhedra are sorted by zones to allow the quick selection of only those polyhedra that potentially intersect the cutting plane. In general, most polyhedra will not intersect the cutting plane, and it is wasteful to try intersections for every polyhedron in the model.

Figure 25:
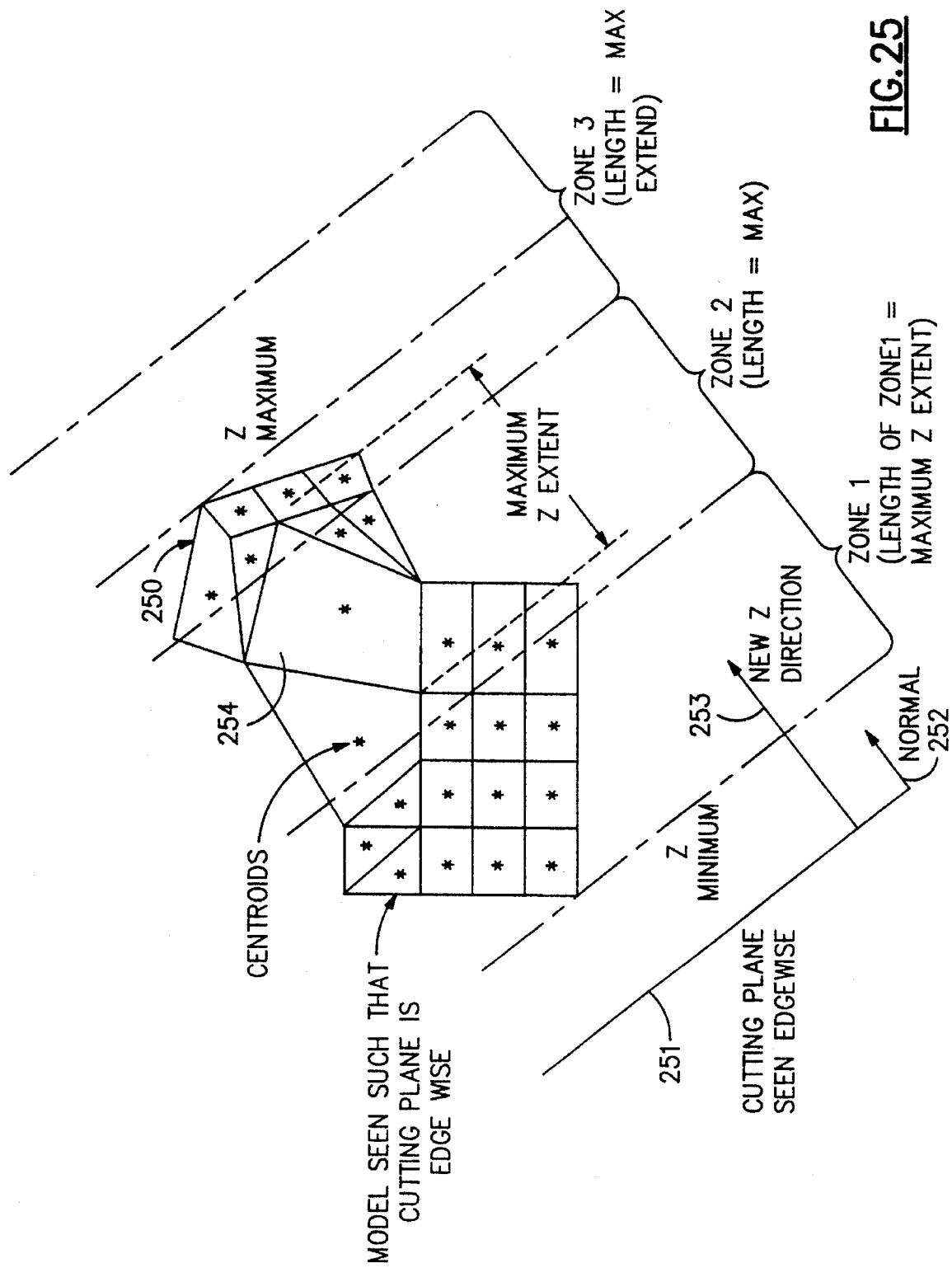
FIG. 25 shows the division of a model into zones in the cutting plane version of my invention.

FIG. 25 shows an example of this technique as applied to a model 250 intersected by a cutting plane 251 having a normal 252. (Although cutting plane 251 is shown in FIG. 25 as being spaced from the model 250, it is assumed that the cutting plane 251 is later moved in the direction of normal 252 to a position at which is does intersect the model). To do the sorting and zoning, the coordinates of the nodes of the model 250 are transformed such that the cutting plane normal direction 252 is parallel to the new Z direction 253. With this coordinate transformation, the model 250 is bounded by a Z minimum (Zmin) and a Z maximum (Zmax), as shown in FIG. 25. The Z direction is then divided into zones between the Z minimum and the Z maximum, the zone length being such that it is the maximum of the Z extents of the polyhedra. In the particular example in FIG. 25, the maximum Z extent for the model 250 is the Z extent of polyhedron 254. Following this division of the coordinate space into zones, each polyhedron of the model 250 is assigned to one of the zones in accordance with the Z values of its vertices, e.g. in accordance with the Z coordinate of the centroid.

By assigning polyhedra to zones based upon the transformed Z coordinates of their vertices, it is enough for a particular position of the cutting plane 251 to test the polyhedra in the current Z zone and in one neighboring zone on either side. Thus, for large models the number of polyhedra to be tested is significantly reduced. This assignment of polyhedra to zones is done only once for a given cutting plane normal, even if the cutting plane itself is translated relative to its original position.

2. Preferred Implementation

Figure 26:
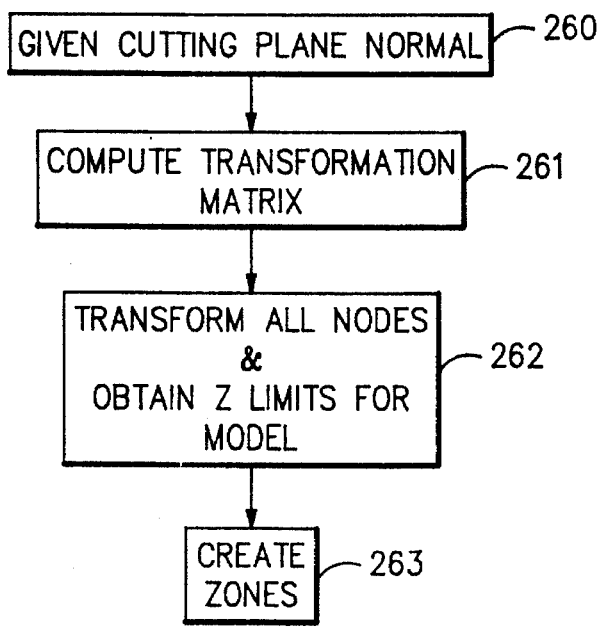
FIG. 26 is a flowchart of the procedure for transforming model coordinates and creating zones in the cutting plane version of the present invention.

FIG. 26 further details the step 225 of transforming model coordinates and creating zones shown in FIG. 22. Given a cutting plane normal (260), the program 62 first computes the transformation matrix (261) for transforming from the original model coordinates, x, y and z (FIG. 27) to transformed coordinates X, Y and Z (FIG. 28) in which the Z axis is parallel to the cutting plane normal 271 (FIG. 27). (Lowercase letters x, y, z identify the original model coordinates, while uppercase letters X, Y, Z identify the transformed coordinates.) Computation of the transformation matrix T, the elements of which are shown in FIG. 29, is a straightforward exercise in analytic geometry which will not be repeated here. In the transformation matrix T, a1 is the angle between the projection 272 of the cutting plane normal 271 onto the xz coordinate plane and the z axis (FIG. 27), while a2 is the angle between the cutting plane normal and the xz plane.

After the transformation matrix T (FIG. 29) has been computed (261), the node coordinates of the model are transformed and the Z limits for the model are obtained (262), as indicated more particularly in Code Listing reproduced below:

```
IF <Zmin is greater than node's Z coordiante> THEN
    Zmin = node's Z coordinate;
ENDIF
ENDIF
END FOR each node in Data File
```

As detailed in the above listing, the x, y and z coordinates of each node entry in the node data file 70 maintained in secondary storage 64 are read, transformed using the transformation matrix T shown in FIG. 29, and stored in area 181 of the corresponding entry in the node array 180 (FIG. 18). The original node data stored in data file 70 is used for this transformation rather than the node data stored in node array 180, since the node coordinates stored in the node array may have been previously transformed and repeated transformation may degrade the precision of the transformed data. As the transformed node coordinates are loaded into node array 180, a running account of the maximum transformed Z coordinate Zmax as well as the minimum transformed Z coordinate Zmin is maintained. At the end of this procedure, the Z limits Zmax and Zmin for the entire model will have been obtained.

Figure 30:
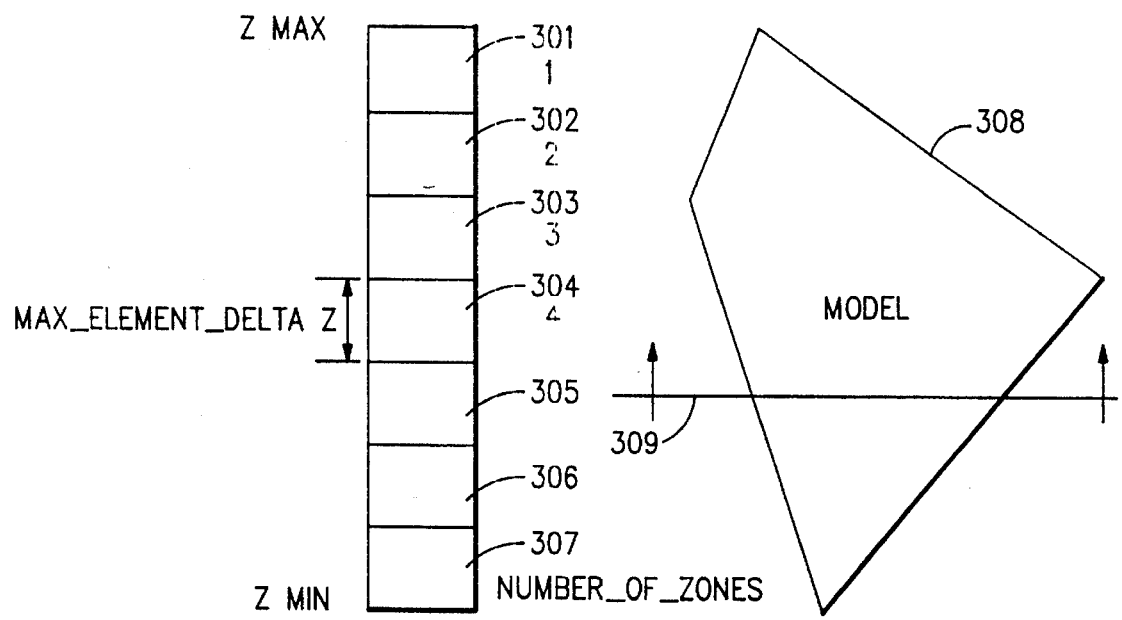
FIG. 30 further illustrates the assignment of zones in the cutting plane version of the present invention.

Following this step (262), the XYZ coordinate space containing the model is partitioned into zones (263), as shown in FIG. 30 and as indicated more particularly in Code Listing 5, reproduced below:

---

CODE LISTING 5

Create Zones

```
FOR each element inh "array of element structure" DO
    Get nodes in elements;
    Loop through nodes; compare Z coordinates and get deltaZ
        for element;
    IF <first element> THEN
        max_element_deltaZ = deltaZ;
    ELSE
        IF <max_element_deltaZ is less than deltaZ> THEN
            max_element_deltaZ = deltaZ;
        ENDIF
    ENDIF
END FOR each element in "array of element structure"
number_of_zones = ((Zmax - Zmin) / max_element_deltaZ) + 1;
FOR each element in "array of element structure" DO
    Get nodes in element;
    Loop through nodes & compute Z center of gravity (ZCG);
    Based on ZCG, add element to "list of elements" in
        appropriate location in "array of zone structure";
END FOR each element in "array of element structure"
```

---

CODE LISTING 4

Transform all Nodes & Obtain Z Limits for Model

```
FOR each node in Data File DO
    read node coordinate from Data File;
    apply transformation to this coordinate;
    store the transformed coordinate in "array of node
        structure";
    IF <first node> THEN
        Zmax = Zmin = node's Z coordinate > THEN
    ELSE
        IF <Zmax is less than node's Z coorinate> THEN
            Zmax = node's Z coordinate;
        ENDIF
```

As indicated in the above listing, the element array 160 (FIG. 16) is traversed to determine the Z extent (deltaZ) over the vertices of each element, as a result of which the maximum Z extent (max_element_deltaZ) for any element in the model 308 (FIG. 30) is obtained. The XYZ coordinate space is then partitioned into zones 301–307, as shown in FIG. 30. Each zone 301–307, except for perhaps the last zone 307, has a Z extent in XYZ coordinate space equal to the previously determined maximum Z extent (max_element_deltaZ) of any of the elements of the model 308. The last zone 307 may have a Z extent of less than the maximum element extent (max_element_deltaZ), since the Z extent (Zmax–Zmin) of the model may not be an integral multiple of the maximum element extent. Zones 301–307 are contiguous in XYZ coordinate space, adjacent pairs of zones being separated by planes perpendicular to the Z axis. Although the zones 301–307 are shown in FIG. 30 as being numbered upwardly from Zmax toward Zmin, this is of course entirely arbitrary and the zones could be numbered upwardly from Zmin if desired.

Referring still to Code Listing 5, after the zones 301–307 have been defined in XYZ coordinate space in this manner, the element array 160 (FIG. 16) is again traversed to determine the Z center of gravity (ZCG) of that element. For convenience, the ZCG of a particular element may be derived simply from the minimum and maximum Z coordinates for that element, and not need be an average taken over all nodes. Based upon the ZCG for the element, each element is added to the list of elements in the appropriate location of the zone array 210 (FIG. 21). This is done by adding another link 212 to the end of the current concatenation of links, if any, for the appropriate zone, with the new link containing an element pointer 213 to the appropriate element in element array 160 and a forward pointer 214 pointing to null, since this is the last link 212 in the chain.

The transformation and zone creation steps shown in FIG. 26 and detailed in Code Listing 4 and 5 are performed only when the cutting plane normal is changed. An existing cutting plane 309 (FIG. 30) may be translated along the Z axis without requiring any additional transformation or zone assignment, since the cutting plane normal in such an instance remains the same.

b. Contour Surface Version

1. General Overview

Figure 31:
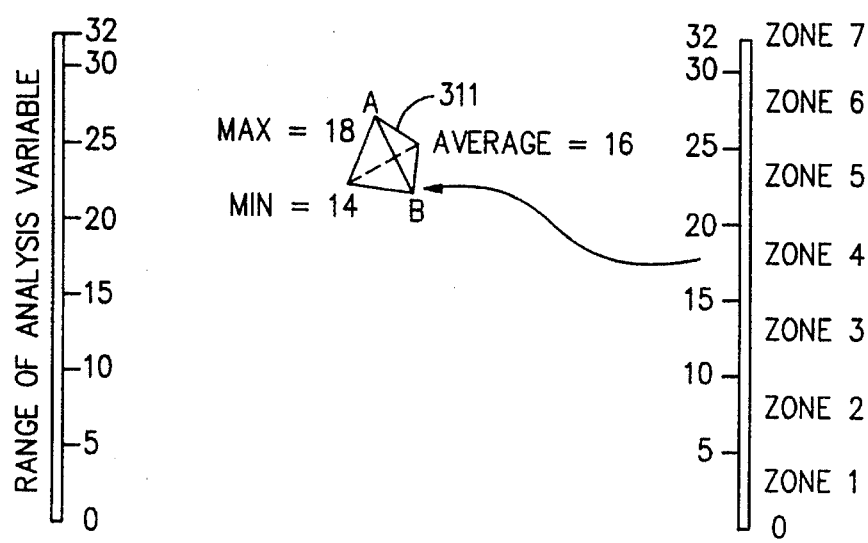
FIG. 31 shows one scheme for associating polyhedra with zones in the contour surface version of my invention.
Figure 32:
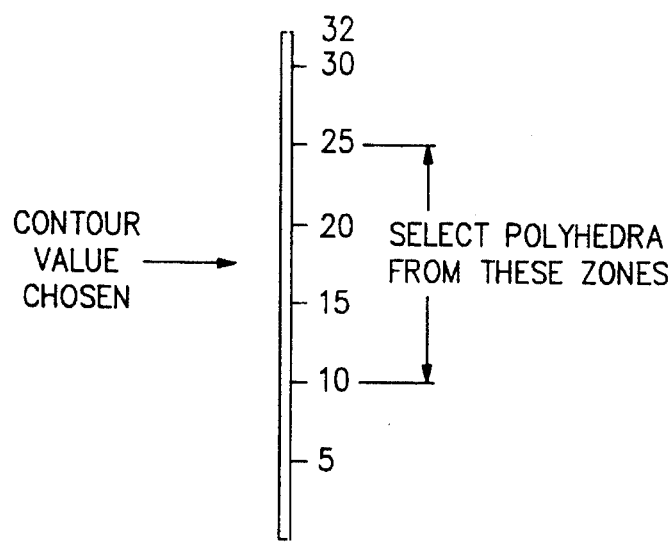
FIG. 32 shows the selection for further processing of zones assigned according to the scheme shown in FIG. 31.

The zoning procedure used for visualizing models based on contour surfaces is similar to the cutting procedure except of course that the zones are defined and the elements are assigned to zones on the bases of the values of results at vertices rather than their (transformed) z coordinates. One possible zoning and sorting scheme is shown in FIGS. 31 and 32. In this procedure, one first examines all of the polyhedra forming the model to determine MAX(Rmax–Rmin), where Rmax and Rmin are the maximum and minimum analysis variable results within a polyhedron. The value MAX(Rmax–Rmin) for the entire model can then be used as the span for each zone. For example, referring to FIG. 31, if the range of values for an analysis variable over the entire model is 0–32, and if MAX(Rmax–Rmin) equals 5, then the zones may be defined as shown in the figure with seven zones.

Next, the average of Rmax and Rmin (or other appropriate statistic of the results at the element vertices) is used to associate each polyhedron with the appropriate zone. As in the cutting plane version discussed above, each polyhedron is associated with exactly one zone. Thus, referring to FIG. 31, a polyhedron 311 of a model may have a maximum result value of 18 at vertex A and a minimum result of 14 at vertex B. Since the average of these maximum and minimum result values is 16, polyhedron 311 is assigned to zone 4, which encompasses results between the values of 15 and 20.

Figure 33:
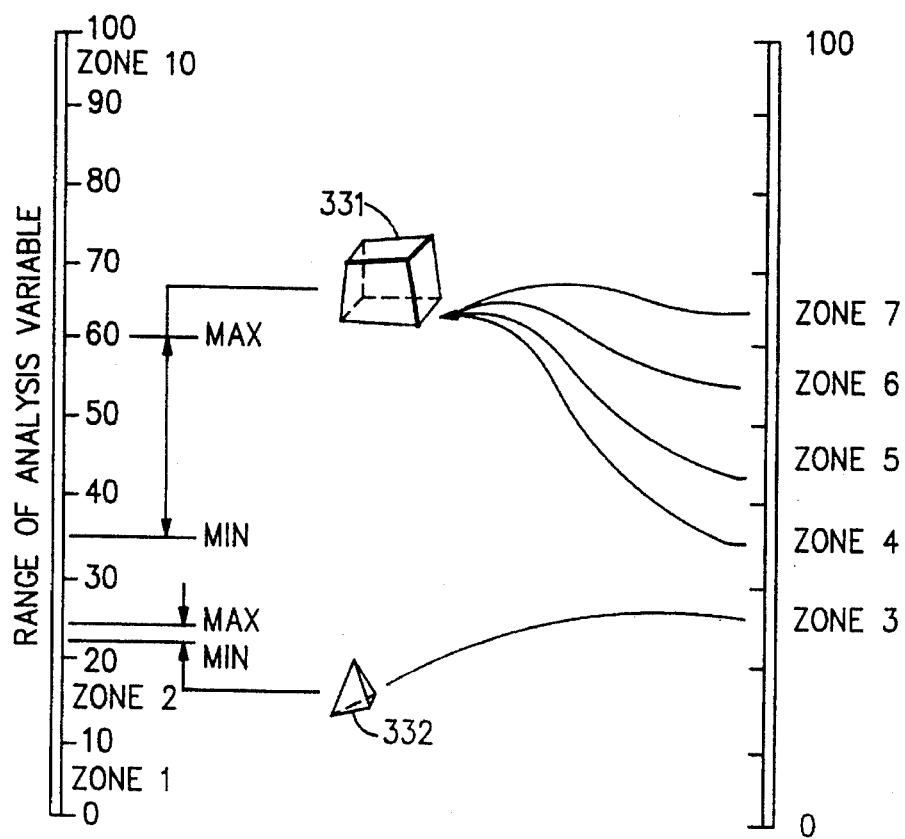
FIG. 33 shows an alternative scheme for associating polyhedra with zones in the contour surface version of my invention.

An alternative scheme of zone assignment, also usable in the cutting plane version of the invention, is shown in FIG. 33. Here, the range of the analysis variable or result defining the contour surface, which extends between 0 and 100 in this particular example, is partitioned into zones of equal extent, without regard to the variation of the analysis result over any particular element of the model. In this case, 10 zones are defined, with zone i extending between 10(i–1) and 10 i. Rather than being assigned to just a single zone, each element of the model is assigned to all zones whose ranges encompass the value of the result over any of its vertices.

Thus, as shown in FIG. 33, the result defining the contour surface ranges between 35 and 60 over the vertices of polyhedron 331 and between 21 and 23 over the vertices of polyhedron 332. Polyhedron, 331 is therefore assigned to each of zones 4 through 7, while polyhedron 332 is assigned to zone 3 only. In this scheme, as contrasted from the schemes in which an element is assigned to only one zone based on an average vertex figure, only the current zone need be searched for potentially intersecting polygons.

2. Preferred Implementation

Figure 34:
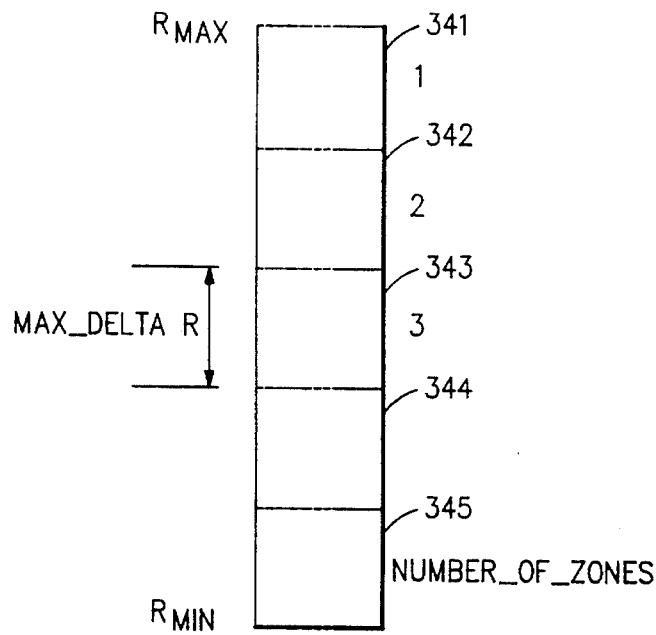
FIG. 34 further illustrates the definition of zones in the contour surface version of the present invention.

The preprocessing procedure for contour surfaces is generally similar to the procedure for cutting planes except that the coordinate space is partitioned on the basis of a particular result variable, and hence no coordinate transformation is required. FIG. 34 and Code Listing 6, reproduced below, set forth more particularly the step 235a (FIG. 23) of obtaining limits for the model.

---
CODE LISTING 6

Obtain result limits for the model

```
FOR each node in Data File DO
    read result value from Data File;
    store result in "array of node structure";
    IF <first node> THEN
        Rmax = Rmin = result value;
    ELSE
        IF <Rmax is less than node's result value> THEN
            Rmax = node's result value;
        ENDIF
        IF <Rmin is greater than node's result value> THEN
            Rmin = node's result value;
        ENDIF
    ENDIF
END FOR each node in Data File
```
---

As indicated in the above listing, for each node in the node data file 70 (FIG. 7) maintained in secondary storage, the result value (75–76) used to generate the contour surface is read from the data file and stored in the result area 182 of the corresponding entry in the node array 180 (FIG. 18). As this is being done, a running account is kept of the maximum result value Rmax and minimum result value Rmin obtained thus far for the model. At the end of this procedure, the result limits Rmax and Rmin for the entire model will have been obtained.

The step 235b of creating zones (FIG. 23) that follows step 235a is indicated more particularly in Code Listing 7, reproduced below:

---
CODE LISTING 7

Create Zones

```
FOR each element in "array of element structure" DO
    Get results at the nodes & compute deltaR;
    IF <first element> THEN
        max_deltaR = deltaR;
    ELSE
        IF <max_deltaR is less than deltaR> THEN
            max_deltaR = deltaR;
        ENDIF
    ENDIF
END FOR each edge in "array of element structure"
number_of_zones = ((Rmax − Rmin) / max_deltaR) + 1;
FOR each element in "array of element structure" DO
    Get nodes in element;
    Loop through nodes & computer Result center of gravity
        (RCG);
```

CODE LISTING 7

Based on RCG, add element to "list of elements" in
 appropriate location in "array of zone structure";
END FOR each element in "array of element structure"

The procedure detailed in the above listing is similar to the corresponding procedure detailed in Code Listing 5 for cutting planes. The maximum result variation (max_deltaR) over any element of the array is obtained, and the result space (and thus the coordinate space) is divided into zones 341–345 (FIG. 34) such that the variation of the selected result within each of the zones, except perhaps the last zone 345, is max_deltaR. As in the cutting plane version, the contour surface zones are defined beginning from Rmax, although the zones may obviously be defined starting with Rmin if desired. As in the cutting plane version, elements of the model (not shown in FIG. 34) are assigned to zones by adding links 212 to the end of the appropriate chain of the zone array 210 (FIG. 21).

The preprocessing steps of obtaining the result limits for the model (235a) and creating zones (235b) detailed in Code Listings 6 and 7 need be performed only once for any particular result variable selected as the basis for the contour surface. These preprocessing steps need not be redone if the value of the result variable is changed, so long as the variable selected (e.g., temperature as distinguished from pressure) remains the same.

8. Intersection Procedure
 a. Cutting Plane Version
  1. Determination of Intersection Points The procedure for performing the step 228 (FIG. 22) of processing the plane and model intersection is shown in more detail in FIG. 35. As already noted, after transformation from the xyz model coordinates to the transformed XYZ coordinates, the Z direction is parallel to the cutting plane normal. The cutting plane is moved in a direction parallel to its normal to generate an appropriate intersection with the model.

To process an intersection between a cutting plane and a model, given a cutting plane position between Zmin and Zmax (350), the program 62 (FIG. 6) first determines which zone (Zone) the cutting plane belongs to, as indicated by its Z position (351). Once this determination has been made, the program 62 then processes only those elements in (Zone−1), Zone and (Zone+1), since they are the only elements that can possibly intersect the cutting plane. For example, referring to FIG. 30, if the cutting plane 309 intersecting model 308 is within zone 305, then the only elements that are tested are those assigned to zones 304, 305 and 306. Elements belonging only to those three zones are selected by traversing the appropriate entries of the zone array 210 (FIG. 21) and processing the elements pointed to by the lists contained in these entries.

Figure 35:
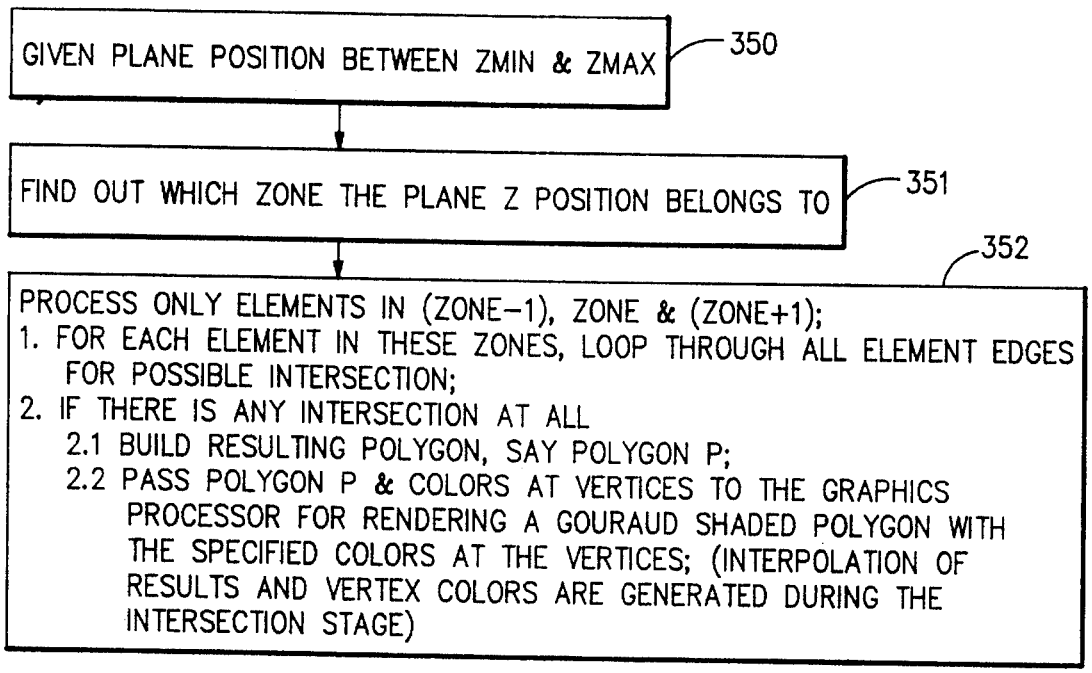
FIG. 35 is a flowchart of the overall steps for processing the plane and model intersections in the cutting plane version of the present invention.

Each element of the three selected zones is processed as indicated in step 352 of FIG. 35. First, each edge of the element is tested for possible intersection with the cutting plane 309 (FIG. 30). If there is an intersection, the resulting polygon is built, in a manner to be described, and the polygon together with the colors at its vertices are passed to the graphics processor 68 (FIG. 6) for rendering a Gouraud-shaded polygon with the specified colors at the vertices.

Code Listing 8, reproduced below, sets forth more particularly the procedure for intersecting an element of one of the three selected zones 304–306 with the cutting plane 309 (FIG. 30):

CODE LISTING 8

Intersect an element in (Zone-1), Zone, (Zone+1) with plane

IF <already_intersected_flag is NOT set for this edge in
  "array of edge structure"> THEN
  IF <edge's Z coordinate crosses the plane Z
    position> THEN
   intersect edge with plane;
   add edge to the "list of intersecting edges for
    current Z plane position";
   get the current result values at the nodes of
    edge and linearly interpolate to get the
    result value at the intersection point;
   convert the interpolated result to a RGB color
    value;
   store intersection coordinate & the color value;
   set already_intersected_flag for this edge;
  ENDIF
 ENDIF
END FOR each edge in element As detailed in the above listing, for each edge of the element, the intersection flag 193 of the corresponding entry of the edge array 190 (FIG. 19) is examined to determined whether the flag is set. A set flag indicates that the edge intersection has been previously computed based on another element of the model. If the intersection flag has been set, then the program proceeds immediately to the next edge. Otherwise, the Z coordinates of the edge vertices are examined to determine whether they straddle the cutting plane. This determination is made by examining the Z coordinates of the nodes pointed to by the list of nodes 191 in the entry for that edge in the edge array (FIG. 19). If the Z coordinates of the nodes do not straddle the cutting plane, the program proceeds to the next edge, since the current edge does not intersect the cutting plane. Otherwise, the intersection of the edge with the cutting plane is determined.

Figure 36:
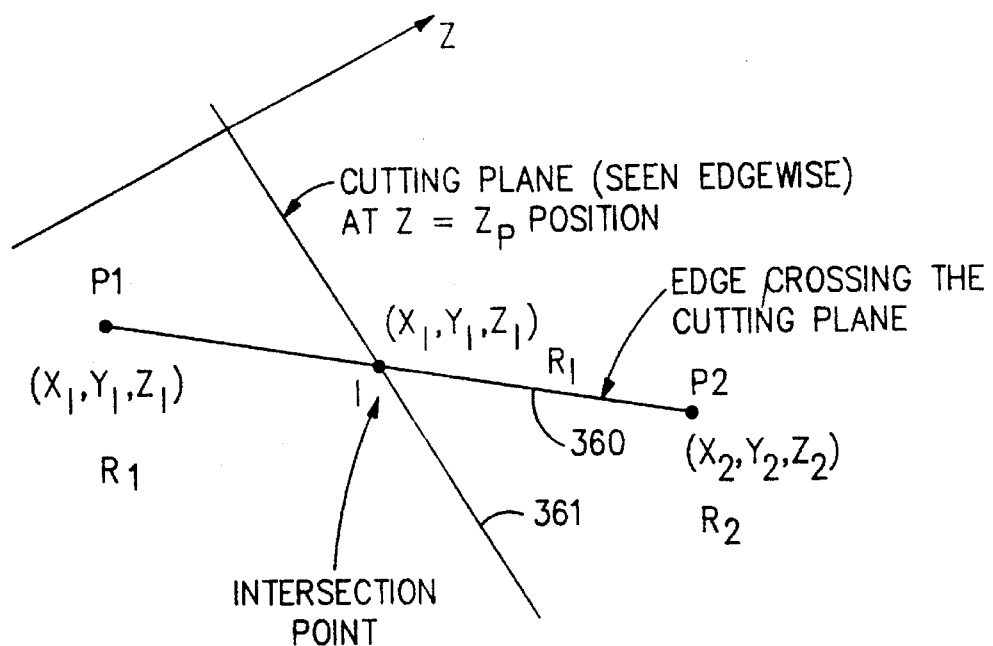
FIG. 36 further illustrates the interpolation procedure in the cutting plane version of the present invention.

The intersection is calculated by linear interpolation, as noted above. This process of interpolation is illustrated in FIG. 36, which shows an edge 360 having endpoints P1 and P2. As illustrated in FIG. 36, edge 360 is intersected by a cutting plane 361 whose Z coordinate is Zp. Assuming that the coordinates and results are X1, Y1, Z1 and R1 at P1 and are X2, Y2, Z2 and R2 at point P2, then the interpolated coordinates and result XI, YI, ZI and RI at intersection point I are given by the following equations:

$$t=(Zp-Z1)/(Z2-Z1) \tag{8.1}$$

$$XI=X1+t(X2-X1) \tag{8.2}$$

$$YI=Y1+t(Y2-Y1) \tag{8.3}$$

$$ZI=Zp \tag{8.4}$$

$$RI=R1+t(R2-R1) \tag{8.5}$$

Referring still to Code Listing 8, after the coordinates for the intersection point I of edge 360 with cutting plane 361 have been determined in this manner (8.1–8.4), edge 360 is added to the list of intersecting edges 200 (FIG. 20). This is done by adding a link 201 to the list 200 having an edge pointer 202 pointing to the entry for edge 360 in edge array 190 (FIG. 19) and the coordinates and color stored in portion 203. Since the newly added link 201 is the last of the chain, list pointer 204 of that link is set to point to null. After edge 360 has been added to list 200, the results R1 and R2 for the nodes P1 and P2 of the edge 360 are obtained and the result RI at the intersection point I is obtained by linear interpolation (8.5). This interpolated result is converted to an RGB color value, which is stored along with the intersection coordinates XI, YI and ZI in portion 203 of the newly added link 201. Finally, the intersection flag 193 for edge 360 in edge array 190 (FIG. 19) is set to indicate that the intersection of this edge with the cutting plane 361 has already been determined and need not be recalculated for any other element of the model.

As an alternative to testing every edge of every element in the selected zone for possible intersection with the cutting plane or contour surface, the minimum and maximum values (Zmin, Zmax) determined for a particular element during the zoning procedure may be saved for later use during the intersection procedure. Thus, if Zmin and Zmax for particular element do not straddle the current Z value, the element may be trivially rejected as not intersected by the cutting plane. Zmin, Zmax may be stored for each element either in the element array 160 (FIG. 16) or, preferably, in the corresponding link 212 of the appropriate list in zone array 210.

2. Connection of Intersection Points

For a given polyhedron, intersection of its edges with the cutting plane generates points on the cutting plane, as indicated for edge 360 in FIG. 36. Once the intersection points constituting a particular intersection polygon (formed by intersection of a polyhedron with the cutting plane) are determined, the remaining task is to connect the points to make the polygon. Thus, referring to FIG. 37, polyhedron 370 is intersected by cutting plane 371 creating vertices A, B, C and D on respective edges P, Q, R and S of the polyhedron. The connection scheme takes these vertices and connects them properly to create the polygon 372 in the cutting plane. The connection process should connect the vertices in a proper sequence. For example, points A and C, as well as B and D, should not be connected. The connection scheme used in the present invention is basically as follows. Two points that belong to the same face of the polyhedron should be connected. That is two points that are generated by edges that are part of the same face of the polyhedron must be connected. In the example shown in FIG. 37, points A and B are generated by the intersection of edges P and Q that are part of face U. Hence points A and B should be connected.

The procedure used to created a closed polygon may be described with reference to FIG. 37. Start with any intersection point, say point A. Pick a face containing edge P (since point A is generated by edge P), say U. Search for an edge that is part of face U that has generated another point. Here, it is edge Q that generated point B. Connect points A and B. Next, pick the second face of edge Q, which is face V. Repeat the above procedures until the starting face U is reached. This procedure allows the polygons to be created very quickly. Note that it is assumed in this procedure that each edge is shared by exactly two faces of the same polyhedron.

This procedure for connecting the intersection points created by the intersection of the edges of a polyhedron with a cutting plane is indicated in more detail in Code Listing 9, reproduced below:

---
CODE LISTING 9
---

Building the Intersection Polygon Within an Element (Connection Scheme)

Loop through element edges and get one intersected edge, say E; (this will be the starting point for the polygon)

---
-continued

CODE LISTING 9
---

Get the coordinate and RGB color representing the result for
   the first point in polygon data to be sent to the
   graphics processor;
Get the local faces sharing this edge, say F1 & F2.
starting_face = F1;
current_face = F1;
current_intersected_edge = E;
FOR each edge in current_face DO
    IF edge is not the same as current_intersected_edge DO
        IF <intersection_flag is set> THEN
            get stored intersection coordinate and RGB
                color;
            add this point to the list of polygon points;
            current_intersected_edge = edge;
            get the lement faces sharing this edge, say F3
              & F4;
            IF <current_face is same as F3> THEN
                current_face = F4;
            ELSE
                current_face = F3;
            ENDIF
            IF <current_face is same as starting_face> THEN
                we have finished creating the polygon;
                Send polygon with vertex colors to the
                    graphics processor;
                exit the FOR loop;
            ENDIF
        ENDIF
    ENDIF
END FOR each edge in current_face

---

As indicated in the above code listing, a list of polygon points is created as the intersection points are connected. When all of the points have been added to the list, the vertex coordinates, as well as the vertex colors representing the vertex results, are sent to the polygon processor 68 (FIG. 6). As noted earlier in this specification, the local ordering arrangement of vertices and edges that is assumed in the data files and data structures generated therefrom permits the determination of a given face of a polyhedron by inspection, without having to examine the coordinate data.

Although the vertex data passed to the polygon processor 68 contains transformed coordinates X, Y, Z, this does not necessarily imply that the model is viewed along the transformed Z axis. In this version, as well as the contour surface version, suitable parameters are passed to the polygon processor 68 to permit display of the model either in its original size and orientation or as rotated and scaled in response to user input.

The above description has assumed that the polyhedra and other elements forming the model are convex. In general, however, the present invention may also be used to visualize models containing concave elements. One complication resulting from the use of concave elements is that the intersection of such an element with a particular cutting plane may result in several polygons that are either disjoint or share a common edge or vertex. The foregoing connection scheme may be adapted for use in such cases by keeping track of the number of intersections for each element and flagging which intersection points have not been used. If all of the intersection points have been used to form an intersection polygon, then the connection procedure for that element is complete. Otherwise, the connection procedure is restarted, with one of the remaining unused points being selected as an initial point, and continued until all of the identified intersection points have been used to form one or more intersection polygons.

b. Contour Surface Version

Figure 38:
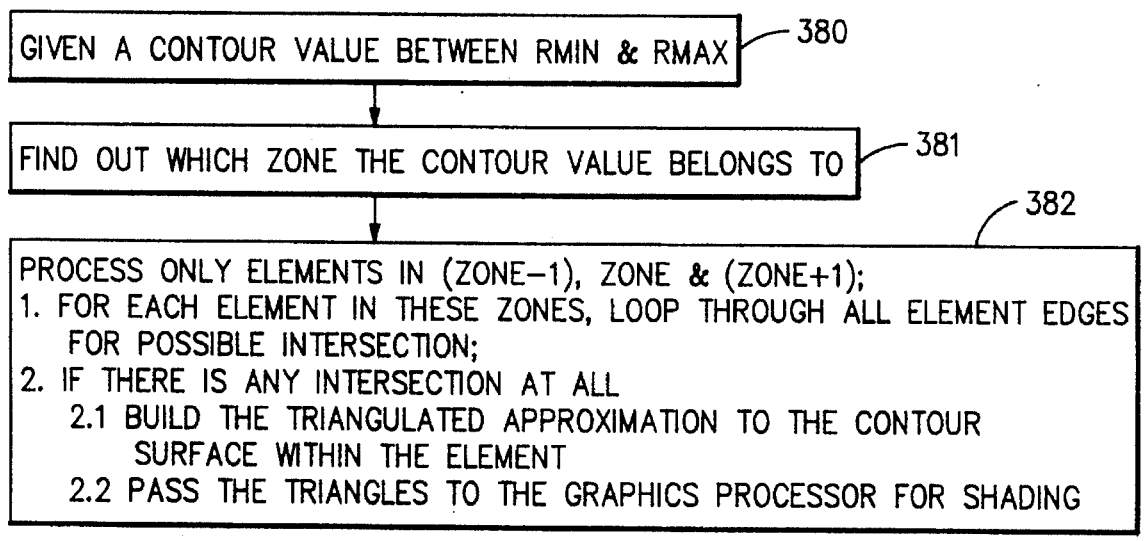
FIG. 38 is a flowchart of the processing of the intersections of the contour surfaces and the model in the contour surface version of the present invention.

The procedure for performing step 238 (FIG. 23) of building a contour surface is shown more particularly in FIG. 38. This procedure is similar to the corresponding procedure for the cutting plane version (FIG. 35), except that a contour surface defined by a result value is involved. Referring to FIG. 38, given a contour value between the minimum (Rmin) and the maximum (Rmax) (FIG. 34) for the model (380), the program 62 (FIG. 6) first determines the zone (Zone) that the contour value belongs to (381). Following this determination, the program proceeds to process only those elements in (Zone−1), Zone and (Zone+ 1), since these are the only elements that can be intersected by the contour surface (382). For each element in those zones, the program tests the element edges for possible intersection by the contour surface. If there is any intersection at all, the program builds the triangulated approximation to the contour surface within the element and passes the triangles thus formed to the graphics processor 68 for shading. Code Listing 10, which is similar to Code Listing 8 for the cutting plane version, details the procedure:

---

CODE LISTING 10

Intersect an element in (Zone-1), Zone, (Zone+1) with contour surface

```
FOR each edge in element DO
    IF <already_intersected_flag is NOT set for this edge in
       "array of edge structure"> THEN
        IF  at the nodes of edge straddle the current
            contour values> THEN
            interpolate to obtain the intersection point;
            add edge to the "list of intersecting edges for
                current contour value";
            store intersection coordinate;
            set already_intersected_flag for this edge;
        ENDIF
    ENDIF
END FOR each edge in element
```

---

Although not shown in Code Listing 10, the data obtained for each intersection and stored in the intersection list 200 (FIG. 20) point may include not only the coordinates of that point, but the color value of a selected result.

As in the cutting plane version, as an alternative to testing every edge of every element in the selected zones for possible intersection with the cutting plane or contour surface, the minimum and maximum values Rmin, Rmax in this instance determined for a particular element during the zoning procedure may be saved for later use during the intersection procedure. Thus, if Rmin and Rmax for a particular element do not straddle the current R value, the element may be trivally rejected as not intersected by the contour surface. Rmin, Rmax may be stored for each element either in the element array 160 (FIG. 16) or, preferably, in the corresponding link 212 of the appropriate list in zone array 210.

Figure 39:
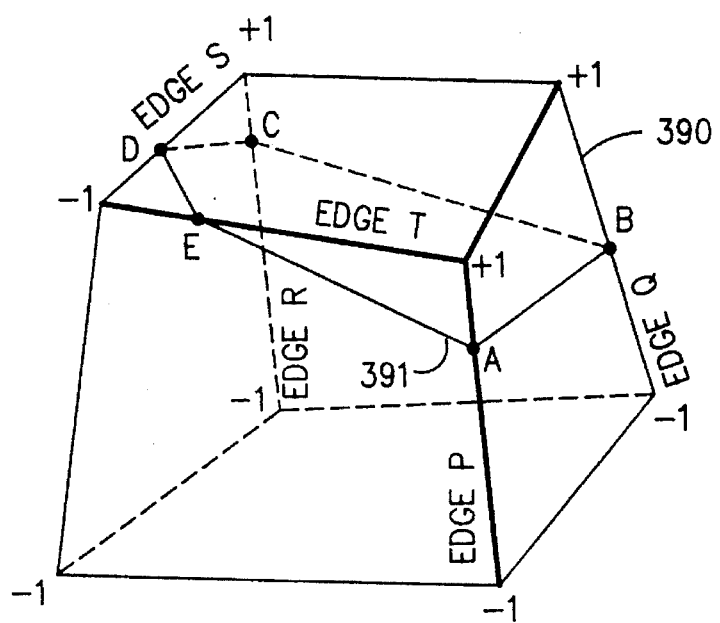
FIG. 39 shows the intersection points resulting from the intersection of the contour surface with a polyhedron.
Figure 40:
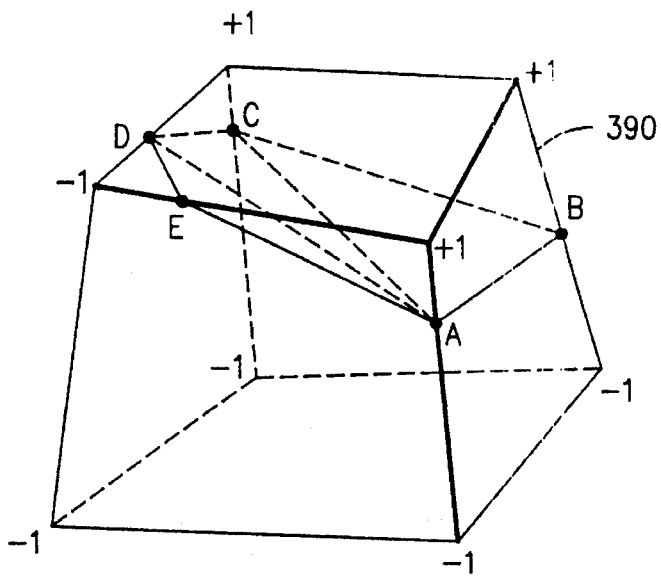
FIG. 40 shows the triangulation of the figure created by the intersection shown in FIG. 39.

FIG. 39 illustrates the intersection of a polyhedron 390 by a contour surface (not shown) to form a closed polyline 391. Vertices A, B, C, D, and E of polyline 391 are the interpolated intersection points of edges P, Q, R, S and T, respectively, of polyhedron 390 for a contour surface of a given value. The approximation to the outline of the intersection of the contour surface with the polyhedron 390 is obtained by successively connecting the two points that belong to a single face of the polyhedron. In the example given, if A is the starting point, lines AB, BC, CD, DE and EA form the polyline 391. This polyline 391, which is generally not planar, is triangulated, that is, divided into one or more triangles (FIG. 40) for supplying to a polygon processor. Preferably, as is described below, the triangles share the starting vertex A as a common vertex and are generated simultaneously with the connection of the vertices forming the polyline 391.

Figure 37:
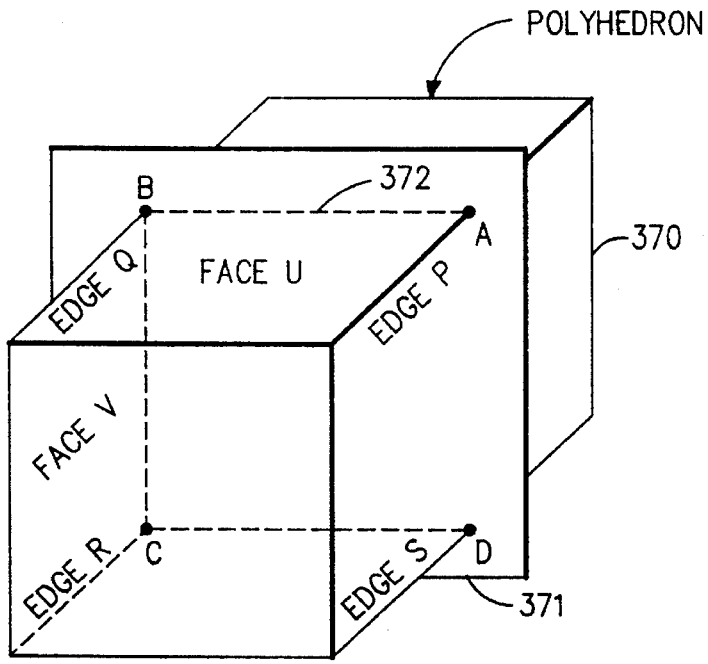
FIG. 37 shows the scheme for connecting the intersection points in the cutting plane version of my invention.
Figure 41:
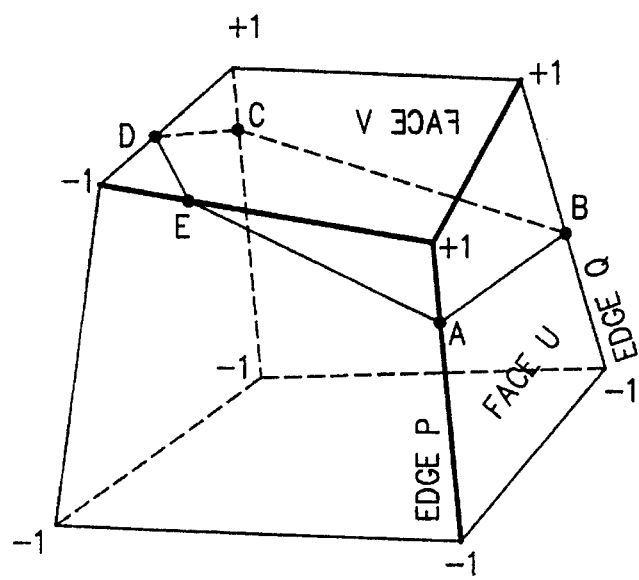
FIG. 41 shows the scheme for connecting the intersection points of FIGS. 39 and 40.

FIG. 41 illustrates the connection scheme for the contour surface version, which is similar to the corresponding scheme for the cutting plane version shown in FIG. 37. The procedure starts with any interpolation point, say point A. Pick a face containing edge P (since point A is generated by edge P), say U. Search for an edge that is part of face U that has generated another point. Here, it is edge Q that generated point B. Connect points A and B. Next, pick the second face of edge Q, which is face V. Repeat the above procedures until the start face U is reached. As the points are connected, triangulation (FIG. 40) can be carried out simultaneously. This connection procedure is detailed further in Code Listing 11, reproduced below:

---

CODE LISTING 11

Building theTriangulated Contour Surface Within an Element (Connection Scheme)

```
Loop through element edges and get one intersected edge,
        say E; (This will be the starting point)
Get the local faces sharing this edge, say F1 & F2;
starting_face = F1;
current_face = F1;
current_intersected_edge = E;
number_of_points = 1;
FOR each edge in current_face DO
    IF <edge is not the same as current_intersected_edge> DO
        IF <intersection_flag is set> THEN
            get stored intersection coordinate;
            add this point to the list of points in
                triangle;
            number_of_points = number_of_points +1;
            IF <number_of_points is 3> THEN
                we have a triangle;
                send triangle to the graphics processor;
                copy the 3rd point into the 2nd point;
                number_of_points = 2;
                note that the 1st point remains the same for
                    all triangles;
            ENDIF
            current intersected edge = edge;
            get the element faces sharing this edge, say F3
                & F4
            IF <current_face is same as F3> THEN
                current_face = F4;
            ELSE
                current_face = F3;
            ENDIF
            IF < current_face is same as starting_face> THEN
                we are done;
                exit the FOR loop;
            ENDIF
        ENDIF
ENDIF
        End FOR each edge in current_face
```

---

Code Listing 11 is similar to Code Listing 9 except for the additional steps involved in the triangulation procedure, performed for the third and each succeeding intersection point. Intersections with contour elements may be handled as in the cutting plane version, described above.

9. Determination of Outer Faces

Figure 42:
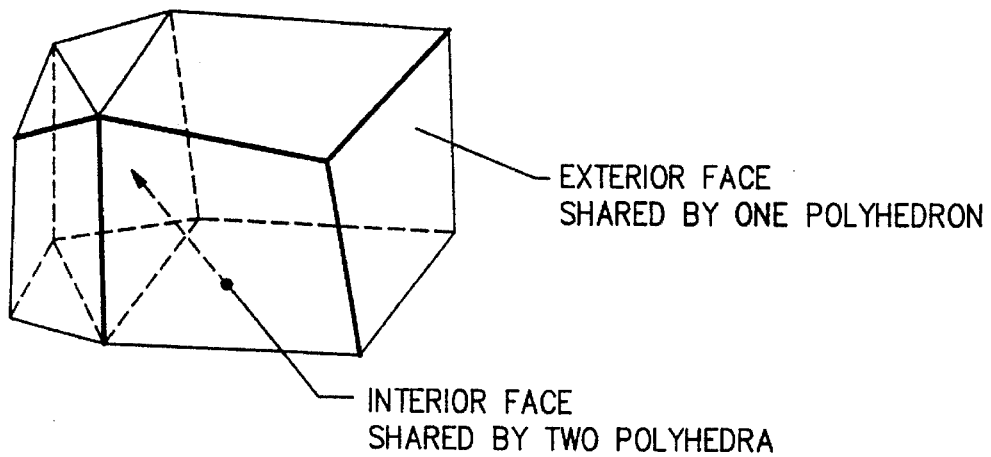
FIG. 42 illustrates an outer face of a polyhedron as well as an inner face shared by another polyhedron of the model.

As noted above, keeping a list of outer faces for a model enables one to draw a model in transparency or show only the results on the outside of the model as Gouraud-shaded. Outer faces are defined as those faces of polyhedra that have only one polyhedron sharing that face. Note that within a model (in the interior) at least two polyhedra can share each face (FIG. 42). This fact can be used to isolate outer faces as a preprocessing step for each model.

Figure 43:
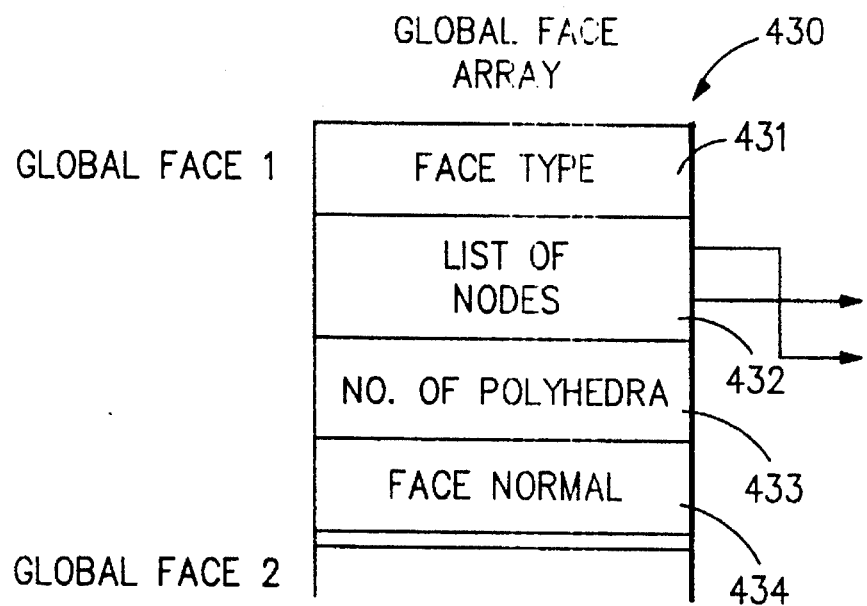
FIG. 43 shows the face array of the data structure used to determine the outer faces of the model shown in FIG. 42
Figure 44:
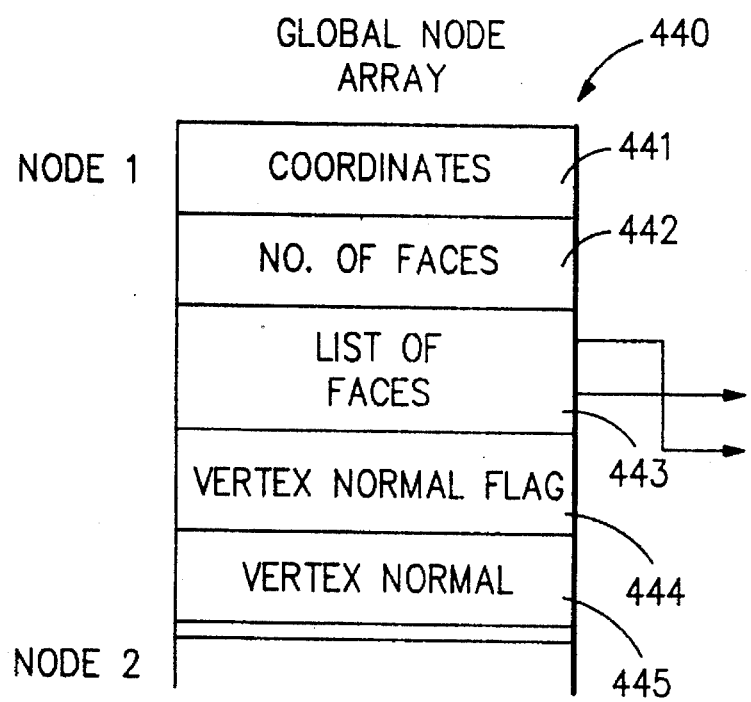
FIG. 44 shows the node array used to determined the outer faces of the model shown in FIG. 41.

FIGS. 43 and 44 show the two additional data structures that may be created during the preprocessing step 221 (FIG. 22) or 231 (FIG. 23). Referring first to FIG. 43, global face array 430 contains an entry for each global face of the model. (By "global" is meant that there is only one entry for each face of the array, even though the same global face might be a local face of more than one polyhedron.) Each entry in the global face array 430 contains a portion 431 indicating the topological face type (i.e., whether the face is a triangle, quadrilateral, etc.), a list 432 of pointers to nodes in a global node array to be described, an indication 433 of the number of polyhedra sharing that face, and the x, y, z components 434 of the normal vector to that face. Referring to FIG. 44, global node array 440, which is distinct from node array 180, contains a single entry for each node of the model. Each node entry in the array 440 contains the node coordinates (441), the number of faces sharing that node (442), a list 443 of pointers to entries in face array 430 corresponding to faces sharing the node, a vertex normal flag 444, and a vertex normal vector 445 which is present if the vertex normal flag 444 has been set. Node array 440 may be created from node data file 70 (FIG. 7) in a relatively straightforward manner. Initially, the number of faces (442) is set equal to zero and the list 443 of faces is empty. Also, the vertex normal flag 444 is reset. The global face array 430 is created from the element data file 80 (FIG. 8) using the procedure detailed in Code Listing 12, reproduced below:

CODE LISTING 12

```
FOR each polyhedron DO
    FOR each local face of polyhedron DO
        IF <Unique global face id exists> THEN
            get global face id.
            add 1 to number of elements sharing
                this global face.
        ELSE
            Create unique global face id,
                add to global face array.
            compute face normal such that the normal
                points to outside of polyhedron (remember,
                we know the local ordering of nodes forming
                any polyhedron face); store normal in
                "array of face structure";
            for each node's global face list.
        END IF
    END FOR each local face of polyhedron
END FOR each polyhedronn
FOR each face in "array of face structure" DO
    IF <number of polyhedra sharing face is equal to 1> THEN
        this is an outer face;
        FOR each node in this outer face DO
            go to the node array;
            IF <vertex normal flag is NOT set> THEN
                LOOP through the list of faces sharing this
                    node;
                    go to "array of face structure" for each
                        face in this list;
                    if this face is an outer face, add face
                        normal to a running node_normal_vector
                        count;
                END LOOP
                average the node_normal_vector count;
                normalize node_normal_vector and stsore it in
                    "array of node structure";
                set the vertex normal flag;
            ENDIF
        END FOR each node in this outer face
        write to a outer_face_polygon_file the global nodes
            on this face;
        write to a vertex_normal_file the global node and its
            vertex normal;
    ENDIF
```

-continued

CODE LISTING 12

```
END FOR each face in "array of face structure"
```

When an entry for a face is added to the face array 430, the number of polyhedra (433) is set equal to 1. If the same face is subsequently identified as being the local face of another polyhedron of the model, the number of polyhedra is incremented to 2, indicating that this is an interior face of the model. At the end of this procedure, the outer faces can be identified by traversing face array 430 to determine those faces shared by only one polyhedron, as indicated by the field 433.

Each vertex shared by an outer face is an outer vertex, lying on the surface of the model, for which an outward normal vector can be defined as the average of the normal vectors (434) of the outer faces sharing the vertex. This outward normal vector is stored in area 445 of the corresponding entry in node array 440 (FIG. 44), and the vertex normal flag 444 is set to indicate that a vertex normal has been calculated.

The normal vectors stored in node array 440 are used by the polygon processor 68 for lighting and shading calculations for the outer faces of the model. Each outer face of the model is rendered as a Gouraud-shaded polygon in accordance with its vertex normals, in a manner that is conventional in the art.

The <unique global face id exists> test function used in Code Listing 12 is defined in Code Listing 13, reproduced below:

CODE LISTING 13

<Unique Global Face ID Exists> Test Function:

```
        get (global) nodes of local face to be tested.
        get list of global faces attached to
            node #1 of local face.
        FOR each global face in list DO
            compare global face nodes to
                local face nodes.
            IF <nodes are same> THEN
                unique global face id exits.
                exit from test function.
            ELSE
                continue in FOR loop
            END IF <nodes are same>
        END FOR each global face in list
            unique global face id does not exist.
END of test function
```

Although a particular visualization system has been shown and described, various modifications of the system described will be apparent to those skilled in the art. Thus, as already noted above, while the polyhedra or other elements of the model have been assumed to be convex, concave elements could also be used. Still other variations from the system shown and described, within the scope of the appended claims, will be apparent to those skilled in the art.

What is claimed is:

1. A computer graphics visualization system for displaying a representation of a graphics model intersected by a surface on a two dimensional display device, the system operating on a computer system having a processor, storage means and a display device, the graphics model comprised of a plurality of polyhedral elements defined by a plurality of vertices each having coordinates in three-dimensional space and each having assigned at least one variable, the system comprising:

means for grouping said polyhedral elements into a plurality of element zones based upon a first value associated with said surface;

selection means for selecting a subset of zones;

means for testing each of said polyhedral elements to determine whether or not said polyhedral element is intersected by said surface;

means for generating coordinates and variable values for each intersection of said surface and said intersected elements;

means for generating a two dimensional figure from said coordinates; and means for displaying said two dimensional figure on said display device.

2. The system of claim 1 wherein said first value is a constant value in said three dimensional coordinate space, and wherein said means for testing tests whether said constant surface value lies between values of said at least one variable at vertices of said element.

3. The system of claim 2 wherein said means for generating determines the intersection of said surface and said element by interpolating between the coordinates of said element vertices.

4. The system of claim 1, wherein each of said element vertices has at least two variables and wherein said means for generating generates a second variable value at each intersection.

5. The system of claim 1 wherein said first value is a value of one of said at least one variable and wherein said means for testing determines whether said surface variable value lies between values of said at least one variable at vertices of said element.

6. The system of claim 5 wherein said means for generating determines the intersection of said surface and said element by interpolating between the values of said at least one variable at said vertices.

7. A method for displaying an image of an intersection between a surface having a first value and a three dimensional model made up of a plurality of polyhedral elements each having vertices defined as coordinate values in a three dimensional space, each of said vertices having at least one variable value, the method comprising the steps of:

creating a plurality of zones based upon said first value and said coordinate values and at least one variable value of said polyhedral elements;

associating each of said plurality of polyhedral elements with at least one of a plurality of zones based on said polyhedral element vertices coordinate values and said at least one variable value;

selecting a subset of said zones based upon said first value;

testing the polyhedral elements associated with each of said subset of zones to identify elements intersecting said surface;

generating an intersection value for each of said intersecting elements;

generating an intersection image from said intersection values; and displaying said intersection image on a display device.

8. A method as in claim 7 in which said elements are defined by a stored data structure, said step of associating said elements with zones including the step of generating a zone array containing a plurality of entries corresponding to respective zones, each of said entries containing a pointer to each element associated with said zone.

9. The method of claim 7, in which each of said vertices has two variable values and wherein the method includes the further step of evaluating said second variable value at said intersections.

10. The method of claim 9 wherein the interpolated value of the second variable is used to shade said visualized image.

11. The method of claim 7 wherein the step of generating an intersection value is accomplished by interpolating between the values of the vertices of said intersecting elements.

12. The method of claim 7 wherein the first value is a constant value of one of said at lease one variable value.

13. The method of claim 7 wherein the first value is a constant value defining a plane in said three dimensional space.

14. The method of claim 13 further comprising the steps of:

converting the vertex coordinate values to coordinates in a transformed XYZ coordinate space so that said plane is coplanar with the Z plane in said coordinate space;

determining the maximum Z variation over the set of elements in said model;

defining said zones in accordance with said maximum Z variation.

15. A method of displaying on a two dimensional display, the intersection of a surface having a surface value and a plurality of polyhedra, said plurality of polyhedra each defined in a three dimensional geometric coordinate space, said polyhedra each having faces and vertices connected by edges, comprising the steps of:

storing said plurality of polyhedra in the storage media of a computer system, said storing step creating in said storage media a first list containing an entry for each of said plurality of polyhedra, a second list containing an entry having endpoint coordinates for each of said edges, and a third list containing an entry having coordinates and a result value for each vertex of Said polyhedra, said first, second and third lists containing pointers to each of the other lists that associate each of said edges and each of said vertices with the one or more of said plurality of polyhedra to which it belongs;

storing in said storage media a fourth list containing a zone entry for each of a plurality of zone, each of said zone entries having a zone range and pointing to a list of zone entries;

testing said surface value to determine whether it is a coordinate value or results value;

if said surface value is a coordinate value, testing each edge of each of said polyhedra against each of said zone ranges and adding an entry for each of said polyhedra to one or more of said lists of zone entries based on the testing result;

if said surface value is a results value, testing each vertex of each of said polyhedra against said zone ranges and adding an entry for each of said polyhedra to one or more of said lists of zone entries based on the testing result;

testing said surface value against said zone ranges to determine a selected zone into which said surface value falls;

for each polyhedron in said selected zone performing the following steps:

selecting a first intersection point at which said surface intersects a first edge of the polyhedron;

selecting a second intersection point at which said surface intersects a second edge of a face of the polyhedron containing the first edge;

generating a first side of an intersection polyline from said first and second points;

storing said first side in said storage media;

repeating the above steps, each time selecting the previous second intersection point as the new first intersection point, generating a next side, and triangulating the polyline formed by the added side, until all edges of said polyhedron have been processed and displaying the intersection polyline on a display device.

* * * * *